US007797510B1

(12) United States Patent
Case et al.

(10) Patent No.: US 7,797,510 B1
(45) Date of Patent: Sep. 14, 2010

(54) MEMORY MANAGEMENT FOR VIRTUAL ADDRESS SPACE WITH TRANSLATION UNITS OF VARIABLE RANGE SIZE

(75) Inventors: Colyn S. Case, Hyde Park, VT (US); Gary D. Lorensen, San Jose, CA (US); Sharon Rose Clay, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 374 days.

(21) Appl. No.: 12/112,602

(22) Filed: Apr. 30, 2008

Related U.S. Application Data

(63) Continuation of application No. 11/077,662, filed on Mar. 10, 2005, now Pat. No. 7,386,697, which is a continuation-in-part of application No. 10/769,326, filed on Jan. 30, 2004, now Pat. No. 7,296,139.

(51) Int. Cl.
*G06F 12/08* (2006.01)
(52) U.S. Cl. .................... 711/207; 345/543
(58) Field of Classification Search ............ 711/207; 345/543
See application file for complete search history.

(56) References Cited

U.S. PATENT DOCUMENTS

| 4,677,546 A | 6/1987 | Freeman et al. |
| 4,835,734 A | 5/1989 | Kodaira et al. |
| 4,992,936 A | 2/1991 | Katada et al. |
| 5,058,003 A | 10/1991 | White |
| 5,375,214 A | 12/1994 | Mirza et al. |
| 5,394,537 A | 2/1995 | Courts et al. |
| 5,446,854 A | 8/1995 | Khalidi et al. |
| 5,465,337 A | 11/1995 | Kong |
| 5,479,627 A | 12/1995 | Khalidi et al. |
| 5,555,387 A | 9/1996 | Branstad et al. |
| 5,784,707 A | 7/1998 | Khalidi et al. |
| 5,796,978 A | 8/1998 | Yoshioka et al. |
| 5,802,605 A | 9/1998 | Alpert et al. |
| 5,809,554 A | 9/1998 | Benayon et al. |
| 5,822,749 A | 10/1998 | Agarwal |
| 5,860,146 A | 1/1999 | Vishin |
| 5,928,352 A | 7/1999 | Gochman et al. |
| 5,930,832 A | 7/1999 | Heaslip |
| 5,956,756 A | 9/1999 | Khalidi et al. |
| 5,963,984 A | 10/1999 | Garibay, Jr. et al. |
| 5,978,893 A | 11/1999 | Bakshi et al. |
| 6,003,123 A | 12/1999 | Carter |
| 6,075,938 A | 6/2000 | Bugnion |
| 6,104,417 A | 8/2000 | Nielsen |

(Continued)

*Primary Examiner*—Jared I Rutz
(74) *Attorney, Agent, or Firm*—Townsend and Townsend and Crew LLP

(57) ABSTRACT

In a virtual memory system, address translation information is provided using a cluster that is associated with some range of virtual addresses and that can be used to translate any virtual address in its range to a physical address, where the sizes of the ranges mapped by different clusters may be different. Clusters are stored in an address translation table that is indexed by virtual address so that, starting from any valid virtual address, the appropriate cluster for translating that address can be retrieved from the translation table. The clusters are dynamically created from a fragmented pool of physical addresses as new virtual address mappings are requested by consumers of the virtual memory space.

16 Claims, 11 Drawing Sheets

U.S. PATENT DOCUMENTS

| | | |
|---|---|---|
| 6,112,285 A | 8/2000 | Ganapathy et al. |
| 6,205,530 B1 | 3/2001 | Kang |
| 6,205,531 B1 | 3/2001 | Hussain |
| 6,260,131 B1 | 7/2001 | Kikuta |
| 6,272,597 B1 | 8/2001 | Fu et al. |
| 6,349,355 B1 | 2/2002 | Draves et al. |
| 6,356,991 B1 | 3/2002 | Bauman et al. |
| 6,374,341 B1 | 4/2002 | Nijhawan et al. |
| 6,418,522 B1 | 7/2002 | Gaertner et al. |
| 6,418,523 B2 | 7/2002 | Porterfield |
| 6,457,068 B1 | 9/2002 | Nayyar et al. |
| 6,477,612 B1 | 11/2002 | Wang |
| 6,560,688 B1 | 5/2003 | Strongin et al. |
| 6,618,770 B2 | 9/2003 | Nayyar et al. |
| 6,628,294 B1 | 9/2003 | Sadowsky et al. |
| 6,728,858 B2 | 4/2004 | Willis |
| 6,766,434 B2 | 7/2004 | Gaertner |
| 6,857,058 B1 | 2/2005 | Gurumoorthy et al. |
| 7,003,647 B2 | 2/2006 | Jacobs et al. |
| 7,050,061 B1 | 5/2006 | Baldwin |
| 7,181,585 B2 | 2/2007 | Abrashkevich et al. |
| 2002/0133685 A1 | 9/2002 | Kalyanasundharam |
| 2004/0117594 A1 | 6/2004 | VanderSpek |
| 2005/0044340 A1 | 2/2005 | Sheets |
| 2005/0055510 A1 | 3/2005 | Hass |

PHYSICAL ADDRESSES

28 KB

12 KB

12 KB

20 KB

16 KB

4 KB

32 KB — 1102
32 KB — 1104

32 KB — 1106
8 KB

20 KB

32 KB — 1108

8 KB

PHYSICAL ADDRESSES

16 KB — 1112
12 KB

12 KB

12 KB

16 KB — 1114
4 KB

16 KB — 1116

4 KB

8 KB

16 KB — 1118
4 KB

8 KB

MEMORY MANAGEMENT FOR VIRTUAL ADDRESS SPACE WITH TRANSLATION UNITS OF VARIABLE RANGE SIZE

CROSS-REFERENCES TO RELATED APPLICATIONS

This application is a continuation of U.S. patent application Ser. No. 11/077,662, filed Mar. 10, 2005, now U.S. Pat. No. 7,386,697, which is a continuation-in-part of application Ser. No. 10/769,326, filed Jan. 30, 2004, now U.S. Pat. No. 7,296,139, which disclosure is incorporated herein by reference for all purposes.

The present disclosure is related to the following commonly-assigned co-pending U.S. patent application Ser. No. 10/769,388, filed Jan. 30, 2004, entitled "Multi-Client Virtual Address Translation System with Translation Units of Variable Range Size"; and Ser. No. 10/769,357, filed Jan. 30, 2004, entitled "Virtual Address Translation System with Caching of Variable-Range Translation Clusters." The respective disclosures of these applications are incorporated herein by reference for all purposes.

BACKGROUND OF THE INVENTION

The present invention relates in general to memory management systems and in particular to memory management for a virtual address space with translation units of variable range size.

Most modern computer systems generally implement some form of virtual memory, in which processes reference system memory locations using a "virtual" address rather than an address of a specific location in the memory. When a process makes a memory request using a virtual address, the system uses a page table to translate the virtual address to a specific location and accesses that location. The page table is typically implemented in a block of memory that includes an entry for each page (e.g., 4 kilobytes) of the virtual address space; the entry stores a physical address of a corresponding page of a physical address space. Page tables can also be structured hierarchically, so that only a portion of the page table needs to be resident in system memory at all times; the portion held in system memory can be used to locate other portions that may have been swapped out.

Virtual memory has a number of common uses. For example, general-purpose computer systems generally cannot guarantee that a process will receive memory resources in any particular arrangement or at any particular location. Virtual addressing enables processes to treat the memory as if it were arranged in a convenient manner, regardless of how it is actually arranged. As another example, systems that support parallel execution of multiple processes can provide a different virtual memory space for each process. This helps to avoid address conflicts between processes. Virtual addressing can also be used to map storage other than system memory, thereby enabling the system to swap data in and out of the system memory, address data in storage devices other than memory storage (e.g., image files resident on a system disk), and so on.

Within graphics processing subsystems, use of virtual memory has been relatively uncommon. Typically, a graphics processing subsystem is implemented on a plug-in printed circuit card that connects to a system bus, such as a PCI (Peripheral Component Interconnect) or AGP (Accelerated Graphics Port) bus. The card usually includes a graphics processing unit (GPU) that implements graphics functionality (e.g., rasterization, texture blending, etc.) and dedicated graphics memory. This memory is generally managed by the GPU or by a graphics driver program executing on the system central processing unit. The GPU can address graphics memory using either physical addresses or offset values that can be converted to physical addresses by the addition of a constant base address. The GPU (or graphics driver program) can also control the arrangement of physical memory allocations. For instance, a pixel buffer that is to be scanned out to a display device can be arranged to occupy a contiguous block of the graphics memory address space. Elements of graphics processing subsystems, including scanout control logic (or display drivers), graphics driver programs, GPUs, and the like are generally designed to use physical addressing and to rely on particular arrangements and allocations of memory.

As the amount of data (e.g., texture data) needed for graphics processing increases, graphics processing subsystems are beginning to rely on system memory for at least some storage of data (and in some instances command lists, etc.). Such subsystems generally use virtual addressing for system memory, with the required address translation being performed by a component external to the graphics processing subsystem. For instance, the AGP bus includes a Graphics Address Relocation Table (GART) implemented in the host-side chipset. Emerging high-speed bus technologies, such as PCI Express (PCI-E), do not provide GART or any other address translation functionality. As a result, graphics cards configured for such protocols will need to implement their own address translation systems if they are to access system memory.

An alternative to the graphics card is an integrated graphics processor (IGP). An IGP is a graphics processor that is integrated with one or more other system bus components, such as a conventional "north bridge" chip that manages the bus connecting the CPU and the system memory. IGPs are appealing as an inexpensive alternative to graphics cards. Unlike conventional graphics cards, an IGP system usually does not include much (or in some cases any) dedicated graphics memory; instead the IGP relies on system memory, which the IGP can generally access at high speed. The IGP, however, generally does not control the physical arrangement or address mapping of the system memory allocated to it. For example, it is not guaranteed that the pixel buffer will occupy a single contiguous block in the physical address space. Thus, designers of IGPs are faced with the choice of redesigning the co-processor and the associated driver programs to use physical addresses provided by the system or relying on virtual addressing.

Given the level of complexity and sophistication of modern graphics processing, redesigning around (unpredictable) physical addresses is a daunting task, which makes a virtual addressing solution desirable. Unfortunately, in many computer systems, virtual addressing can introduce a significant degree of memory overhead, making this option too slow or resource intensive for graphics processing components such as display systems. For example, a typical display system provides a screen's worth of pixel data (e.g., 1280×1024 pixels at four bytes per pixel, for a total of over 5 MB per screen) from the pixel buffer to a display device at a constant screen refresh rate of about 70 Hz. Virtual address translation for this much data would introduce an additional latency that is potentially long and may be highly variable. Such long or variable delays in receiving pixel data from memory could result in incorrect (or black) pixels, or other undesirable artifacts. In addition, if address translation for scanout or other purposes requires a large number of page table accesses, performance of other system components may be adversely affected (e.g., due to congestion on the bus or in the system memory). Conventional address caching and translation lookaside buffer techniques do not alleviate the problem because it is difficult and expensive to provide an on-chip cache large enough to hold all the page addresses needed for scanout.

Another solution is to maintain a complete page table on the graphics chip, thereby allowing faster access times and/or less variability in latency. This solution, however, becomes impractical for large page table sizes. Still another solution divides the virtual address space into "large" and "small" sections, depending on whether the section is mapped to blocks of contiguous physical addresses that exceed a "large size" threshold of e.g., 32 or 64 KB. Pointers to the physical address blocks for "large" sections are stored on chip, while for "small" sections, a lookup in the complete page table is required to complete the translation. In some cases, the result of the most recent page table lookup for each of some number of translation clients can be stored and re-used until the client requests a virtual address on a different page. Such systems can reduce the number of page table accesses in some situations, but the ability to store only one result per client and the inability to share results can still lead to a large number of page table accesses.

Thus, an improved virtual memory system that reduces the number of page table accesses required to translate a group of virtual addresses would be desirable.

BRIEF SUMMARY OF THE INVENTION

Embodiments of the present invention provide systems and methods for managing a virtual memory space in which address translation information is provided using a translation data structure, referred to herein as a "cluster," that is associated with some range of virtual addresses; the cluster can be used to translate any virtual address in its range to a physical address. The sizes of the ranges mapped by different clusters may be different, and the size of the cluster data structure may be independent of its range size. Clusters may be stored in an address translation table that is indexed by virtual address so that, starting from any valid virtual address, the appropriate cluster for translating that address can be retrieved from the translation table.

According to one aspect of the present invention, a method is provided for managing a virtual memory space. A pool of physical addresses is provided. A request for a virtual memory allocation is received from a client. A plurality of clusters is created from the pool. Each cluster represents a number of physical addresses selected from the pool, and the respective numbers of physical addresses represented by different ones of the clusters correspond to different amounts of memory. The physical addresses represented by each cluster that is created are removed from the pool. For each of the clusters, a mapping is defined between a range of virtual addresses in the virtual memory space and the physical addresses represented by the cluster. A reference to a mapped virtual address is returned to the client.

Clusters may be created from the pool in a variety of ways. In one embodiment, an attempt is made to create exactly one cluster that represents all of the physical addresses in the pool. In the event that the attempt is not successful, the pool is separated into two or more sub-pools, and an attempt is made to create exactly one cluster that represents all of the physical addresses in one of the two or more sub-pools.

In another embodiment, a target range size is set to a maximum range size, and an attempt is made to create a cluster that represents physical addresses corresponding to an amount of memory equal to the target range size. In the event that the attempt is unsuccessful, the target range size is set to a smaller value, and the attempt to create a cluster is repeated.

In still another embodiment, where each cluster includes references to two or more blocks of contiguous physical addresses, a candidate block is selected from the pool based on an order of physical addresses, the first candidate block having a first block size. An attempt is made to create a cluster that references the candidate block and at least one other block having the first block size. In the event that the attempt is unsuccessful, a portion of the candidate block is selected as a new candidate block, the new candidate block having a second block size, and an attempt is made to create a cluster that references the new candidate block and at least one other block having the second block size.

The following detailed description together with the accompanying drawings will provide a better understanding of the nature and advantages of the present invention.

DETAILED DESCRIPTION OF THE INVENTION

Embodiments of the present invention provide systems and methods for managing a virtual memory space in which address translation information is provided using a translation data structure, referred to herein as a "cluster," that is associated with some range of virtual addresses; the cluster can be used to translate any virtual address in its range to a physical address. The sizes of the ranges covered by (or mapped by) different clusters may be different, and in some embodiments, the size of the cluster data structure is independent of its range size. For example, in one embodiment, each cluster is 16 bytes and can map anywhere from 4 to 512 pages of the virtual address space. Clusters may be stored in an address translation table (e.g., in system memory) that is indexed by virtual address so that, starting from any valid virtual address, the appropriate cluster for translating that address can be retrieved from the translation table.

The present description is organized as follows: Section I describes examples of computer systems according to embodiments of the present invention; Section II describes a cluster table implementation of an address translation table according to one embodiment of the present invention; and Section III describes further embodiments of the invention. It is to be understood that all embodiments described herein are illustrative and not limiting of the scope of the invention.

I. Computer System Overview

Figure 1:
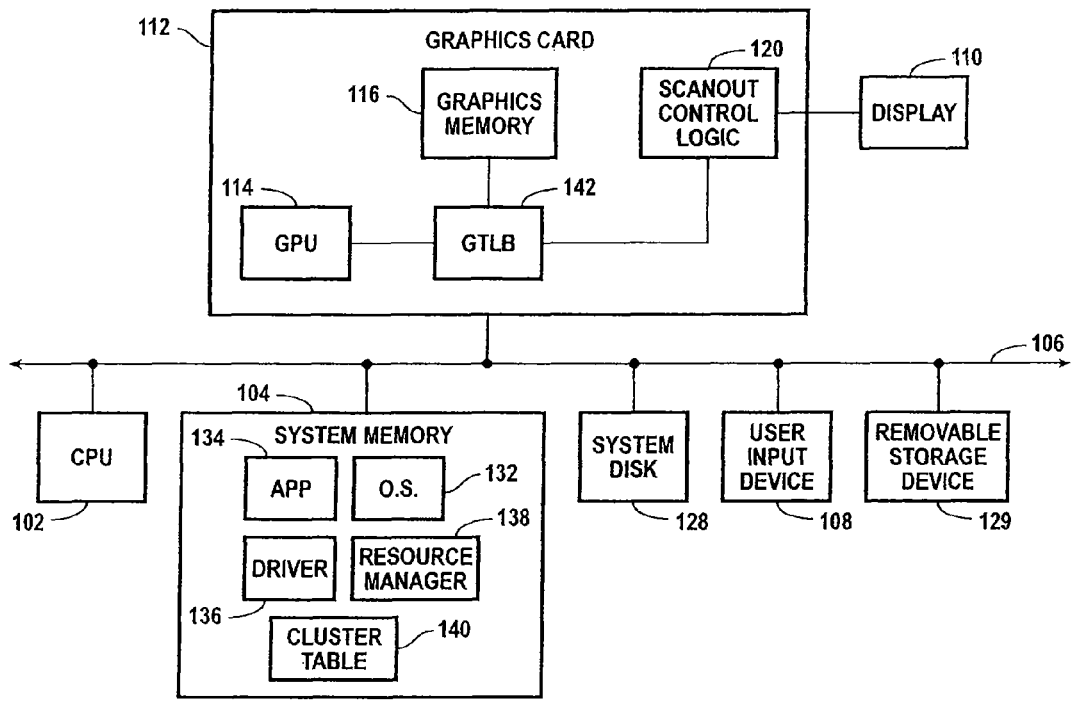
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics card 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port) and/or PCI Express (PCI-E); appropriate "bridge" chips such as a north bridge and south bridge (not shown) may be provided to interconnect various components and/or buses.

Graphics card 112 includes a graphics processing unit (GPU) 114, a graphics memory 116, a graphics translation lookaside buffer (GTLB) 142, and scanout control logic 120, which may be implemented, e.g., using one or more integrated circuit devices (including programmable processors and/or application specific integrated circuits (ASICs)). GPU 114 may be configured with one or more processing cores to perform various tasks, including generating pixel data from graphics data supplied via system bus 106, interacting with graphics memory 116 to store and update pixel data, and the like. Such elements of GPU 114 may be of generally conventional design, and a detailed description is omitted. Communication with graphics memory 116 is managed by GTLB 142.

Scanout control logic 120 reads pixel data from graphics memory 116 (or, in some embodiments, system memory 104) via GTLB 142 and transfers the data to display device 110 to be displayed. In one embodiment, scanout occurs at a constant refresh rate (e.g., 80 Hz); the refresh rate can be a user selectable parameter. Scanout control logic 120 may also perform other operations such as adjusting color values for particular display hardware; generating composite screen images by combining the pixel data with data for a video or cursor overlay image or the like obtained, e.g., from graphics memory 116, system memory 104, or another data source (not shown); converting digital pixel data to analog signals for the display device; and so on. It will be appreciated that the particular configuration of graphics card 112 or its components is not critical to the present invention.

During operation of system 100, CPU 102 executes various programs that are (temporarily) resident in system memory 104. In one embodiment, these programs include one or more operating system (OS) programs 132, one or more application programs 134, one or more driver programs 136 for graphics card 112, and a resource manager program 138 that provides various support services to driver program 136. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 128, and/or in other storage space.

Operating system programs 132 and/or application programs 134 may be of conventional design. An application program 134 may be, for instance, a video game program that generates graphics data and invokes appropriate rendering functions of GPU 114 to transform the graphics data to pixel data. Another application program 134 may generate pixel data and provide the pixel data to graphics card 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics card 112. Driver program 136 advantageously implements one or more standard application program interfaces (APIs), such as Open GL, Microsoft DirectX, or D3D for communication with graphics card 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer graphics data or pixel data to graphics card 112 via system bus 106, to invoke various rendering functions of GPU 114, and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

Resource manager 138 is advantageously provided to support interactions of driver program 136 with system hardware components such as system memory 104. Resource manager 138 implements low-level hardware- and operating-system-specific functionality that is used by driver program 136 in processing requests from operating system programs 132 and/or application programs 134. For example, resource manager 138 may handle tasks such as allocation and deallocation of system memory for driver program 136 and/or GPU 114. Providing resource manager 138 enables program code for driver program 136 to be written at a level of abstraction that hides details of the hardware and/or operating system on which driver program 136 is executed; thus, the same driver code can be adapted to different hardware configurations by providing a different implementation of resource manager 138. It will be appreciated that the functionality of resource manager 138 might also be implemented in driver program 136.

In system 100, GPU 114 can access system memory 104 by reference to virtual addresses, which are translated to physical addresses in order to fulfill the memory access request. An address translation table 140, shown as being resident in system memory 102, stores translation information that can be used to convert a given virtual address to the corresponding physical address. In accordance with an embodiment of the present invention, the translation information is advantageously stored in one or more clusters, where a cluster is a data structure that provides the translation information for a variable-size range of the virtual address space. Embodiments of cluster data structures and cluster tables that implement address translation table 140 are described in Section II below. Although address translation table 140 is shown as being resident in system memory 104, it may also be stored elsewhere, e.g., in graphics memory 116 or in GPU 114.

GTLB 142 receives memory requests from various "clients" executing in a processing core (not shown) of GPU 114 and/or from scanout control logic 120 and performs address translations in the course of responding to these requests. In response to a memory request that includes a virtual address (or in response to an address translation request that does not include a memory access request), GTLB 142 retrieves a cluster from address translation table 140 or from its own cache of recently used clusters and converts the virtual address to a physical address based on data contained in the cluster. GTLB 142 is advantageously implemented such that address translation can be made invisible to some or all clients; that is, a client can simply issue a memory access command referencing a virtual address and receive a response (including the data, in the case of a read command) from the appropriate physical memory system, without the client needing to be aware that any translation has occurred. Thus, existing driver programs and/or GPU-implemented algorithms can be used regardless of whether the memory being used is dedicated graphics memory 116 or system memory 104. In this embodiment, GTLB 142 also manages access by components of graphics processing subsystem 112 to system memory 104, graphics memory 116, and any other physical memory resource of system 100 that is accessible to graphics processing components. For each such resource, GTLB 142 performs the appropriate address translation; in some instances (e.g., for graphics memory 116), no translation may be required. In other embodiments, GTLB 142 manages only accesses to system memory 104; access to graphics memory 116 may be provided via an alternative path.

In the course of its operations, GTLB 142 may store copies of some or all of the clusters retrieved from address translation table 140 in its own cache (not shown), thereby facilitating the handling of subsequent requests for similar resources. GTLB 142 may be implemented in various ways, examples of which are described in application Ser. No. 10/769,326, parent of the present application. GTLB 142 can be implemented in hardware resident on graphics card 112 (optionally integrated with GPU 114), in software executing on GPU 114 and/or CPU 102, or any combination thereof.

Figure 2:
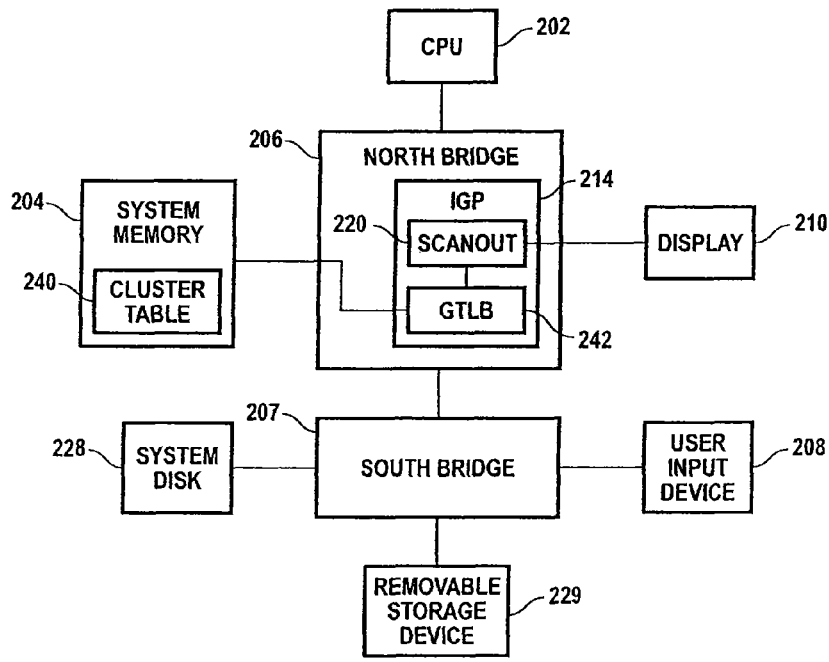
FIG. 2 is a block diagram of a computer system according to another embodiment of the present invention.

FIG. 2 is a block diagram of another computer system 200 according to another embodiment of the present invention. Computer system 200 includes a CPU 202 and system memory 204 communicating via a "north bridge" chip 206. North bridge chip 206 advantageously implements one or more high-speed bus protocols (these may be conventional protocols) that facilitate rapid communication between CPU 202 and system memory 204. North bridge chip 206 also communicates with a "south bridge" chip 207 that implements one or more bus protocols (which may be the same as or different from protocols used by north bridge chip 206) for connecting various peripheral devices, such as a user input device 208, a system disk 228, and a removable storage device 229. South bridge chip 207 and any peripheral devices may be of generally conventional design.

North bridge chip 206 includes an integrated graphics processor (IGP) 214 that implements graphics functionality similar to that of GPU 114 of system 100 (FIG. 1). For example, IGP 214 includes scanout control logic 220 that provides pixel data to a display device 210. (Scanout control logic 220 may be generally similar to scanout control logic 120 of FIG. 1.) IGP 214 also includes a GTLB 242 that manages access to system memory 204 for IGP 214 and its components, including scanout control logic 220.

Operation of system 200 is generally similar to operation of system 100 described above. For example, a graphics driver program, a resource manager program, application programs, and operating system programs (not shown) may be executed by CPU 202. In system 200, IGP 214 might not have access to a dedicated graphics memory area at all, although some embodiments may include at least a small amount of dedicated graphics memory. If IGP 214 does not have dedicated graphics memory, or if additional memory beyond the dedicated graphics memory is required, IGP 214 accesses system memory 204 by reference to virtual addresses that are translated to corresponding physical addresses. An address translation table 240 is provided for storing address translation data (e.g., clusters), and GTLB 242 performs the address translations. Address translation table 240 and GTLB 242 may be generally similar in design and operation to address translation table 140 and GTLB 142 of FIG. 1.

It will be appreciated that systems 100 and 200 are illustrative and that variations and modifications are possible. Arrangement of system components may be varied; for instance, in some embodiments, communication with system memory may be routed through the CPU. Some components may be duplicated or absent as desired. A graphics card may be implemented with any amount of on-card memory or with no dedicated graphics memory at all, and a GPU can use a combination of on-card memory and system memory in any manner desired. Where a graphics card has no on-card memory, the GPU may use system memory exclusively. An IGP can be provided with dedicated memory if desired and can use a combination of dedicated memory and system memory in any manner desired. A single computer system may include multiple graphics processors implemented using any combination of IGPs and/or GPUs. For example, a graphics card based on the AGP or PCI-E bus standard can be connected to north bridge chip 206 or south bridge chip 207 of FIG. 2, as is known in the art, and various control technologies can be provided for controlling operations of the multiple graphics processors. One or more graphics processors may also be implemented as a separate chip that mounts onto the motherboard of a computer system. In view of the present disclosure, persons of ordinary skill in the art will recognize that the present invention can be embodied in a wide variety of system configurations.

It will also be appreciated that, although the address translation techniques described herein are introduced in the context of graphics processing subsystems, these techniques may also be adapted for other computer system components that use virtual addressing. For example, an address translation table in accordance with an embodiment of the present invention may be implemented for other peripheral devices (e.g., disk drives), for virtual memory management by a CPU, and so on. Accordingly, where the following description refers to a "client," it is to be understood that the client may be any component of a computer system that accesses any memory resource by reference to a virtual address or that requests a translation of a virtual address.

In embodiments described herein, the physical memory resource is of generally conventional design. Physical memory is byte-addressable and is allocated by the operating system in fixed-size units (e.g., 4 KB) of physically adjacent memory locations; the fixed-size unit is a "page" in the physical address space. The physical address of a byte of memory is specified by a page address and a byte offset within the page. It is to be understood that a physical address may be expressed in various ways, including as a "linear address" that may be further converted to a hardware-dependent identifier of a particular storage location (e.g., row and column addresses for a memory cell array).

The number of bits in a physical address or page address is implementation dependent and may vary, e.g., according to the size of the physical address space for a particular system. By way of illustration, some examples herein refer to a 36-bit physical address space in which the 24 most significant bits (MSBs) of an address determine the page address and the 12 least significant bits (LSBs) correspond to the byte offset within a 4 KB page. Bit ranges within addresses are sometimes represented herein as a range of bits, e.g., [$Addr_{35}$:$Addr_{12}$] for the page address, and [$Addr_{11}$:$Addr_0$] for the byte offset. Those of ordinary skill in the art will recognize that other embodiments adapted to different implementations of physical memory (e.g., different page sizes, different sizes and organizations of physical address space, addressability in units other than bytes) and that the present invention is not limited to any particular memory system or physical address space.

II. Cluster Table

A cluster table that implements an address translation table according to an embodiment of the present invention will now be described. This cluster table, which can be resident in the main system memory (e.g., cluster table 140 of FIG. 1 or 240 of FIG. 2) or elsewhere in the system, provides data that can be used to translate virtual addresses to physical addresses. Like a conventional page table, an entry in the cluster table is accessed by reference to a virtual address. Unlike a conventional page table, the cluster table entry does not directly provide the address for the corresponding page of physical memory. Instead, each cluster table entry stores a data structure (called a cluster) that maps some range of the virtual address space to physical addresses. As will become apparent, the size of the range mapped by a cluster can vary, depending on how the physical memory is allocated; a single cluster can map an arbitrarily large range of virtual address space.

A. Cluster Table Structure

Figure 3:
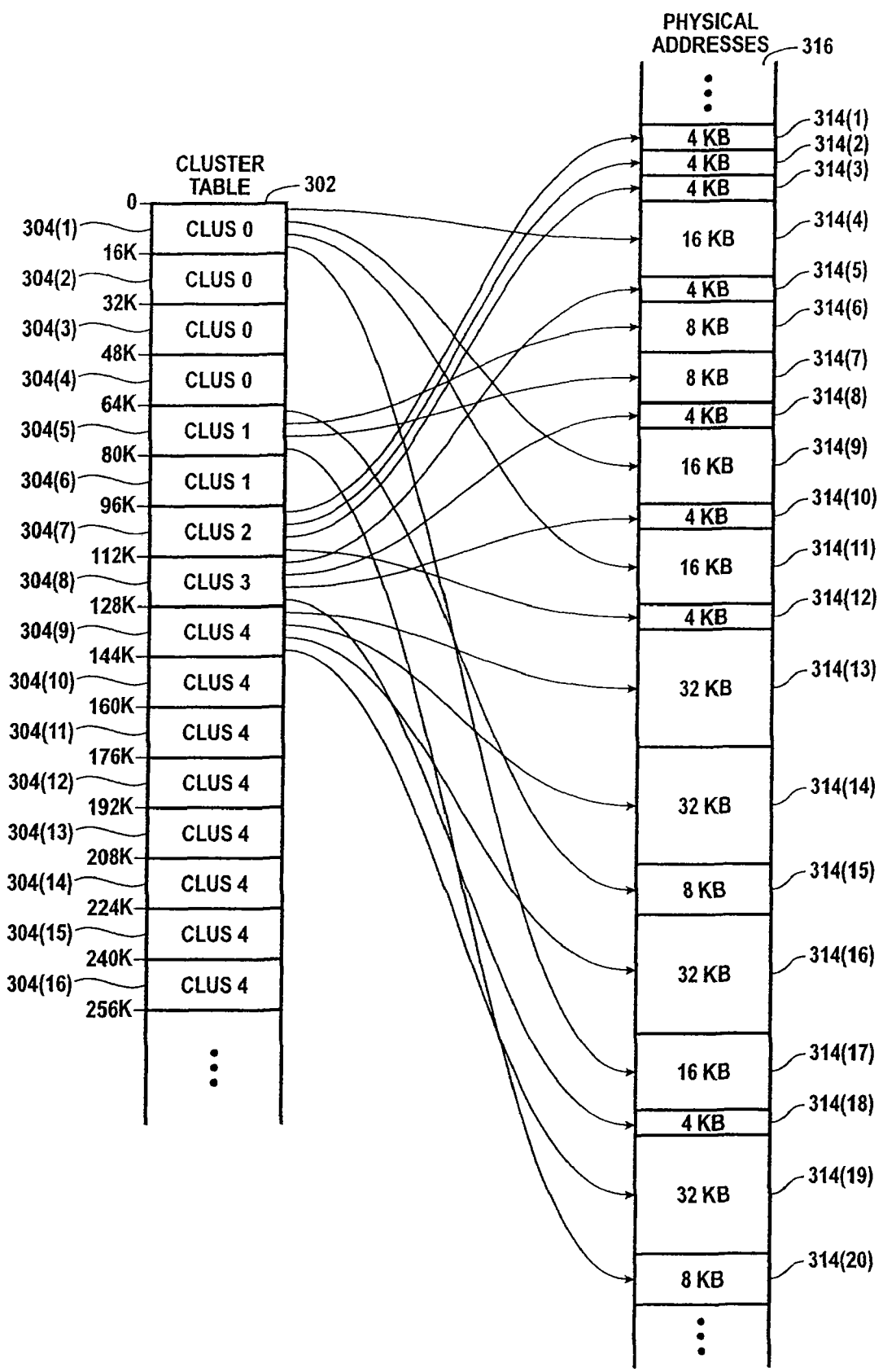
FIG. 3 illustrates a mapping from a cluster table to physical addresses according to an embodiment of the present invention.

FIG. 3 is a conceptual illustration of a mapping from a cluster table to physical addresses according to an embodiment of the present invention. At the left is a cluster table 302, which contains a number of entries 304. (Herein, multiple instances of like objects are denoted with reference numbers identifying the object and parenthetical numbers identifying the instance where needed.) An entry 304 in cluster table 302 is accessed by reference to the virtual address index 306 shown at left; index 306 may be obtained for any given virtual address, e.g., by aligning that virtual address at a 16K boundary. For example, a virtual address of 86K would align to an index 306 value of 80K, which corresponds to entry 304(6). In some embodiments, determining the virtual address index from a virtual address includes additional manipulations, such as dividing by 1024, so that the index can be used as an offset relative to a base address of the cluster table in system memory. Such manipulations are known in the art.

Each entry 304 stores a cluster (represented as CLUS n, where n=0, 1, 2, . . . ), and the same cluster can be stored in multiple entries (e.g., CLUS 0 is stored in each of entries 304(1)-304(4)). In this embodiment, each cluster is a fixed-size data structure (e.g., 16 bytes) that can map a variable range of the virtual address space to corresponding physical addresses; it is to be understood that in other embodiments, different clusters may have different sizes. The mapping is provided by address translation data in the cluster. The address translation data generally includes a starting address for a block of contiguous addresses (e.g., page addresses) in the physical address space, and sequential virtual addresses in the cluster's range are mapped to sequential physical addresses in the block. In some embodiments, clusters may include starting addresses for more than one block; sequential virtual addresses can be mapped to sequential physical addresses in the first block until the first block is exhausted, then to sequential physical addresses in the second block, and so on for any number of blocks.

FIG. 3 also illustrates how clusters CLUS 0-CLUS 4 of cluster table 302 might map to a physical address space 316. Physical address space 316 includes a number of blocks 314, where each block 314 is a contiguous range of physical addresses and is mapped to a contiguous range of virtual addresses. Each block is also labeled with its size (in KB). In this example, each cluster CLUS n provides mappings via pointers to four blocks 314. (Examples of encoding such pointers into a cluster data structure are described below.) The four blocks 314 pointed to by a particular cluster CLUS n are all the same size (e.g., CLUS 0 points to four blocks 314(4), 314(9), 314(11), 314(17) that are 16 KB each), but there is no necessary relationship between the locations of the four blocks. In addition, blocks pointed to by different clusters may be of different sizes (e.g., CLUS 0 points to 16-KB blocks 314(4), 314(9), 314(11), 314(17) while CLUS 1 points to 8-KB blocks 314(6), 314(7), 314(15), 314(20)). The block size for each cluster is determined when that cluster is created, as described in Section II.D below. In general, block size is affected by the degree of fragmentation present in the physical memory. In other embodiments, one cluster may point to blocks of different sizes; in still other embodiments, some relationship (e.g., locality) between the addresses of blocks pointed to by a cluster may be required.

Each entry 304 in cluster table 302 may be regarded as a "virtual block" in the virtual address space. All virtual addresses within the address range of a virtual block are guaranteed to be mapped to physical addresses by the cluster stored in that entry; e.g., all addresses in the 80-96 KB range corresponding to entry 304(6) are mapped by CLUS 1. It is to be understood that the virtual block size need not correspond to a physical page size of the physical address space; e.g., each virtual block (i.e., entry) in cluster table 302 covers four 4-KB physical pages. It should also be noted that some clusters might map virtual addresses for more than one virtual block; e.g., CLUS 1 is also stored in entry 304(5) and therefore also maps virtual addresses in the 64-80 KB virtual block. Thus, the "range" of a cluster (i.e., the set of all virtual addresses mapped by that cluster) may include any number of virtual blocks.

To the extent that an entry 304 may be regarded as a virtual block, the index 306 used to find the cluster for that entry may be regarded as a virtual block address. For instance, in cluster table 302, a virtual address (e.g., vAddr=86 KB) can be translated by first identifying the virtual block to which it belongs, i.e., the corresponding index 306 (e.g., 80 KB, or in some embodiments 80). Using the index 306, a cluster (e.g., CLUS 1) for the virtual block (e.g., entry 304(6)) is obtained from cluster table 302, and a translation operation is performed on the cluster to obtain the physical address, which in this example would be in one of physical blocks 314(6), 314(7), 314(15), 314(20). It should be noted that in this embodiment, prior knowledge of the size of the virtual address range mapped by a cluster is not required to obtain the correct cluster. Thus, no more than one access to cluster table 302 is required to translate any virtual address.

Given a cluster, the translation operation for a virtual address mapped by that cluster depends on the particular cluster structure used in a given embodiment. Examples of cluster structures and associated translation operations will now be described; it will be appreciated that these structures and operations are illustrative and not restrictive of the scope of the invention.

B. Cluster Structure Examples

Figure 4A:
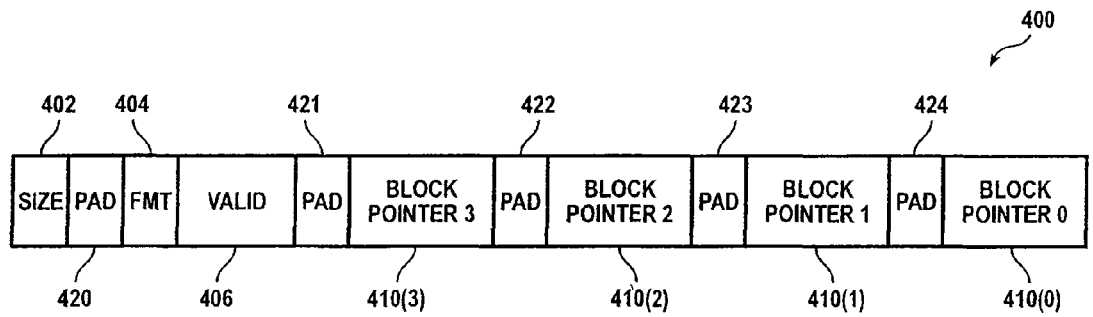
FIGS. 4A-C are bit-field representations of cluster data structures according to embodiments of the present invention.
Figure 4B:
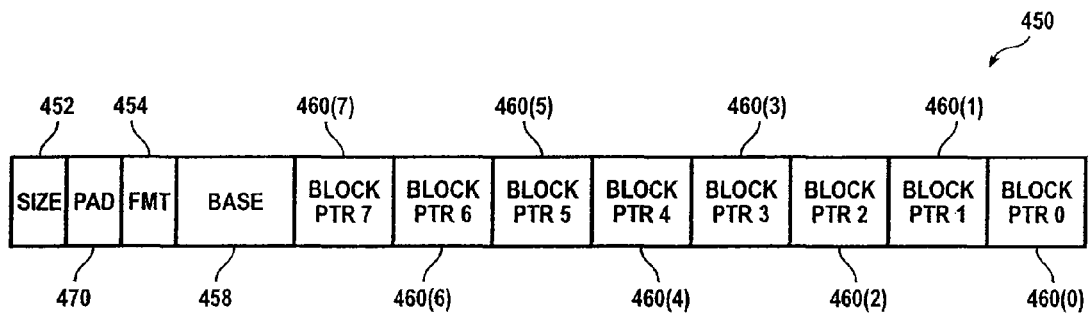

FIGS. 4A-B are bit-field representations of two cluster data structures according to embodiments of the present invention. FIG. 4A shows bit fields of a four-block cluster 400 (which may be stored as clusters CLUS n in cluster table 302 of FIG. 3), and FIG. 4B shows bit fields of an eight-block cluster 450 that may be stored in the same cluster table with four-block clusters 400 of FIG. 4A.

Turning first to FIG. 4A, four-block cluster 400 is a 16-byte (128-bit) data structure for mapping part of a 36-bit physical address space. Cluster 400 provides physical addresses for the respective starting locations of each of four blocks, which may be located anywhere in the physical address space. Blocks of varying sizes can be mapped by cluster 400, although each of the four mapped blocks has the same size.

In this embodiment, cluster 400 includes a 3-bit size index 402. Size index 402 encodes the size of each of the four blocks mapped by the cluster. Eight block sizes are supported, from a minimum size of 4 KB (one page) up to a maximum size of 512 KB (128 pages). Since the total amount of memory mapped by cluster 400 (referred to herein as the "range size") is four times the block size, size index 402 also encodes the range size, which varies from 16 KB (four one-page blocks) to 2048 KB (four 128-page blocks). Block sizes and range sizes corresponding to each value of size index 402 for cluster 400 are summarized in Table 1. It will be appreciated that other block or range sizes, including larger sizes, could be supported if desired, e.g., by expanding size index 402 to a larger number of bits.

TABLE 1

| Size index | Block Size (KB) | Range Size (KB) |
| --- | --- | --- |
| 0 | 4 | 16 |
| 1 | 8 | 32 |
| 2 | 16 | 64 |
| 3 | 32 | 128 |
| 4 | 64 | 256 |
| 5 | 128 | 512 |
| 6 | 256 | 1024 |
| 7 | 512 | 2048 |

Format field 404 comprises one bit. In this embodiment, the bit is set to "0" for a four-block cluster. As will be seen below, format field 404 allows four-block clusters 400 and eight-block clusters 450 to co-exist in the same cluster table. In other embodiments, more than two formats can be supported, and format field 404 may contain additional bits so that each format has a unique identifier. In still other embodiments, only one cluster format is supported, and format field 404 may be omitted.

Valid field 406 also comprises one bit, which is set to "1" (or logical True) if the cluster contains valid block addresses and to "0" (or logical False) otherwise. For example, when the system is initialized, before any memory is mapped to virtual addresses, the cluster table would be filled with clusters with a valid bit of "0." As memory is mapped, the valid bit is changed for the appropriate clusters. When a cluster is accessed, its valid bit can be checked and any requests that return invalid clusters can be flagged.

Cluster 400 also includes four 24-bit "block pointer" fields 410. Each block pointer field 410 stores the page address (e.g., physical address or pointer) of the first page in one of the four blocks of physical address space mapped by cluster 400. Each page address is advantageously stored as a page index (e.g., without the 12 LSBs that correspond to byte offset within a page). The block pointers are advantageously arranged so that the lowest virtual addresses mapped by cluster 400 correspond to block pointer 410(0), the next virtual addresses correspond to block pointer 410(1), and so on. Accordingly, if a requested virtual address is in the first quarter of the range mapped by cluster 400, block pointer 410(0) is used to obtain the physical address; if the requested virtual address is in the second quarter, then block pointer 410(1) is used; and so on. It should be noted that the block pointers need not be arranged in order of physical address.

As an example, in cluster table 302 of FIG. 3, entry 304(1) stores a cluster CLUS 0, which may be an instance of cluster 400. In this example, block pointer 410(0) would store the starting address for block 314(4), block pointer 410(1) would store the starting address for block 314(9), block pointer 410(2) would store the starting address for block 314(11), and block pointer 410(3) would store the starting address for block 314(17).

For an invalid cluster, valid field 406 is set to logical false, and each block pointer field 410 is advantageously set to reference a "bit bucket" page in the system memory. As is known in the art, a bit bucket is an area of system memory that is guaranteed not to be used for storing meaningful data and therefore is a safe target for invalid (or null) pointers. When block pointer fields 410 of invalid clusters are set to reference a bit bucket page, any memory access operations that reference (by virtual address) an invalid cluster can be processed normally without affecting any data.

The remaining pad fields 420-424 include a total of 27 bits, bringing the size of cluster 400 to 16 bytes. Any number of pad fields can be arranged as desired within cluster 400. In this embodiment, pad fields 420-424 are not used to share cluster information, but other embodiments may use some or all of these bits (e.g., if more than 24 bits are needed for each block pointer 410).

Turning now to FIG. 4B, eight-block cluster 450 is also a 16-byte (128-bit) data structure for mapping part of a 36-bit physical address space. Cluster 450 provides physical addresses for the respective starting locations of each of eight blocks. The eight-block cluster allows a larger number of mappings (eight rather than four) to be stored in a single cluster although, as will be seen, the physical addresses of each of the eight blocks are required to have some number of MSBs in common. (Where this is not the case, two four-block clusters 400 can be used instead.)

In this embodiment, cluster 450 includes a three-bit size index 452. Like size index 402 of cluster 400, size index 452 encodes the size of each of the blocks mapped by the cluster 450, as well as the range size (which in the case of an eight-block cluster is eight times the block size). Block sizes and range sizes for size index 452 are summarized in Table 2. It will be appreciated that other block sizes or range sizes, including larger sizes, could also be supported, and that size index 452 may be modified to include the appropriate number of bits.

TABLE 2

| Size field | Block Size (KB) | Range Size (KB) |
|---|---|---|
| 1 | 4 | 32 |
| 2 | 8 | 64 |
| 3 | 16 | 128 |
| 4 | 32 | 256 |
| 5 | 64 | 512 |
| 6 | 128 | 1024 |
| 7 | 256 | 2048 |

Comparing Table 2 with Table 1, it will be apparent that size indices 402 and 452 are defined such that a given value of size index 402 or 452 corresponds to the same range size, regardless of whether the cluster is a four-block cluster 400 or an eight-block cluster 450. (Thus, for eight-block clusters, a size index value of zero is not used.) In embodiments where four-block clusters 400 and eight-block clusters 450 co-exist, this size-index definition allows the range size of a cluster to be readily determined without knowing whether the cluster is a four-block or eight-block cluster. Other definitions may also be used, and a particular size index value in eight-block cluster 450 need not correspond to any particular size index value in four-block cluster 400.

In eight-block cluster 450, format field 454 comprises one bit, which is set to "1" to distinguish eight-block cluster 450 from four-block cluster 400. Thus, a cluster table can store any combination of four-block and eight-block clusters, and the format field (advantageously placed at the same bit position for both cluster types) can be used to determine whether a particular cluster is a four-block or eight-block cluster.

Unlike four-block cluster 400, eight-block cluster 450 does not include a valid field, and eight-block clusters 450 are presumed valid. Eight-block cluster 450 may be invalidated by setting format field 454 to "0", making it a four-block cluster 400 whose valid bit 406 can then be set to "0". (Bit bucket references are advantageously entered in block pointers 410 as described above.)

Cluster 450 also includes a ten-bit base field 458 and eight fourteen-bit block pointer fields 460. These fields encode the respective physical addresses of the first page in each of eight blocks of memory. In one embodiment, base field 458 holds ten MSBs common to the physical addresses of all eight blocks, and each block pointer field 460 holds the next fourteen bits for one of the blocks, so that the starting physical address for a block can be formed by concatenating one of the block pointer fields 460 with base pointer field 458. In some embodiments, blocks may share fewer than ten MSBs; examples will be described below. Block pointers 460 are advantageously arranged so that the lowest virtual addresses mapped by cluster 450 correspond to block pointer 460(0), the next virtual addresses correspond to block pointer 460(1), and so on. Accordingly, if a requested virtual address is in the first eighth of the range mapped by cluster 450, block pointer 460(0) is used to obtain the physical address; if the requested virtual address is in the second eighth, then block pointer 460(1) is used; and so on. It should be noted that the block pointers are not necessarily arranged in order of physical address.

The remaining pad field 470 includes two bits, bringing the size of cluster 450 to 16 bytes. These pad bits may be disposed as desired within cluster 450. In this embodiment, pad field 470 is not used to store cluster content, although other embodiments might use these bits.

Figure 4C:
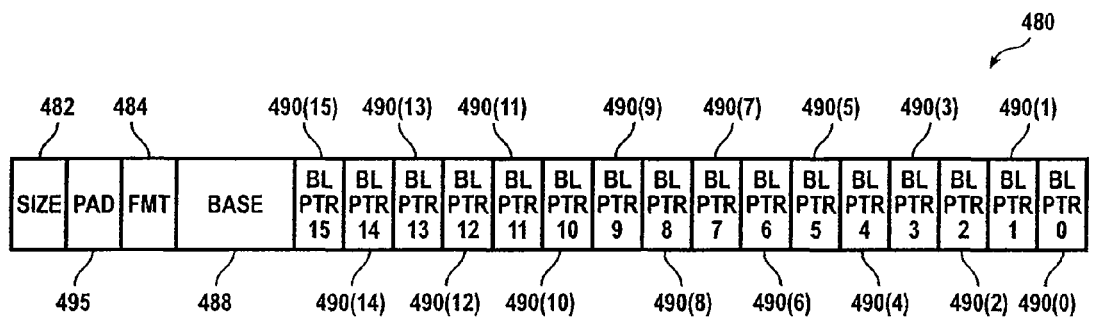

In some embodiments, sixteen-block clusters may also be used instead of or in addition to the four-block and eight-block clusters described above. As shown in FIG. 4C, sixteen-block cluster 480 is also a sixteen-byte (128-bit) data structure for mapping part of a 36-bit physical address space. Cluster 480 provides physical addresses for the respective starting locations of each of sixteen blocks. Compared to eight-block cluster 450, sixteen block cluster 480 allows a larger number of mappings to be stored in a single cluster, with a tighter constraint on locality (i.e., a larger number of MSBs in common.)

In this embodiment, cluster 480 includes a three-bit size index 482. Like size index 402 of cluster 400, size index 482 encodes the size of each of the blocks mapped by the cluster 480, as well as the range size (which in the case of a sixteen-block cluster is sixteen times the block size). Size index values analogous to those in Tables 1 and 2 can be used, so that a given value of size index 402 or 452 or 482 corresponds to the same range size, regardless of whether the cluster is a four-block cluster 400, an eight-block cluster 450, or a sixteen-block cluster 480. (Thus, for sixteen-block clusters, size index values of zero or 1 might not be used.) It will be appreciated that other block sizes or range sizes, including larger sizes, could also be supported, and that size index 482 may be modified to include the appropriate number of bits. As noted above, other definitions for the size index may also be used, and a particular size index value in sixteen-block cluster 480 need not correspond to any particular size index value in four-block cluster 400 or eight-block cluster 450.

In sixteen-block cluster 480, format field 484 comprises two bits, although other numbers of bits may be used. In embodiments where four-block clusters 400, eight-block clusters 450 and sixteen-block clusters 480 may all coexist in a cluster table, the format fields for all cluster formats are advantageously two bits wide, and a distinct two-bit code is associated with each cluster format. The format field (advantageously placed at the same bit position for all cluster types) can be used to determine whether a particular cluster is a four-block, eight-block, or sixteen-block cluster.

Like eight-block cluster 450, sixteen-block cluster 480 does not include a valid field, and sixteen-block clusters 480 are presumed valid. Cluster 480 may be invalidated by setting format field 484 to the appropriate value for a four-block cluster 400, whose valid bit 406 can then be set to "0". (Bit bucket references are advantageously entered in block pointers 410 as described above.)

Cluster 480 also includes an eighteen-bit base field 488 and sixteen six-bit block pointer fields 490. These fields encode the respective physical addresses of the first page in each of sixteen blocks of memory. In one embodiment, base field 488 holds eighteen MSBs common to the physical addresses of all eight blocks, and each block pointer field 490 holds the next fourteen bits for one of the blocks, so that the starting physical address for a block can be formed by concatenating or adding bits from one of the block pointer fields 490 with base pointer field 488; specific examples described below for an eight-block cluster can be readily extended to a 16-block cluster 480. Block pointers 490 are advantageously arranged so that the lowest virtual addresses mapped by cluster 480 correspond to block pointer 490(0), the next virtual addresses correspond to block pointer 490(1), and so on. Accordingly, if a requested virtual address is in the first sixteenth of the range mapped by cluster 480, block pointer 490(0) is used to obtain the physical address; if the requested virtual address is in the second sixteenth, then block pointer 490(1) is used; and so on. It should be noted that the block pointers are not necessarily arranged in order of physical address.

The remaining pad field 495 includes eight bits, bringing the size of cluster 480 to 16 bytes. These pad bits may be disposed as desired within cluster 480. In this embodiment, pad field 480 is not used to store cluster content, although other embodiments might use these bits.

It will be appreciated that the cluster formats described herein are illustrative and that variations and modifications are possible. The term "cluster" is to be understood as including any data structure that is associated with some range of virtual addresses and that can be used to translate a virtual address in that range to a physical address. Cluster data structures may be adapted to provide translation data for various ranges of virtual address space, and clusters translating different-sized ranges in the virtual address space may co-exist in a cluster table. The virtual address space may be of any desired size (e.g., 32 bits, 36 bits, 39 bits or other sizes). Cluster data may be structured in any manner desired, and the content or format of a cluster may vary from the embodiments described herein. Clusters are advantageously constructed such that the size of the cluster data structure is constant, regardless of the size of the address range mapped.

C. Address Translation Using Clusters

Embodiments of processes for using clusters to translate virtual addresses to physical addresses will now be described, with reference to the four-block clusters 400 and eight-block clusters 450 of FIGS. 4A-B. It is to be understood that similar processes may be implemented for other cluster formats, such as the sixteen-block format of FIG. 4C.

Figure 5A:
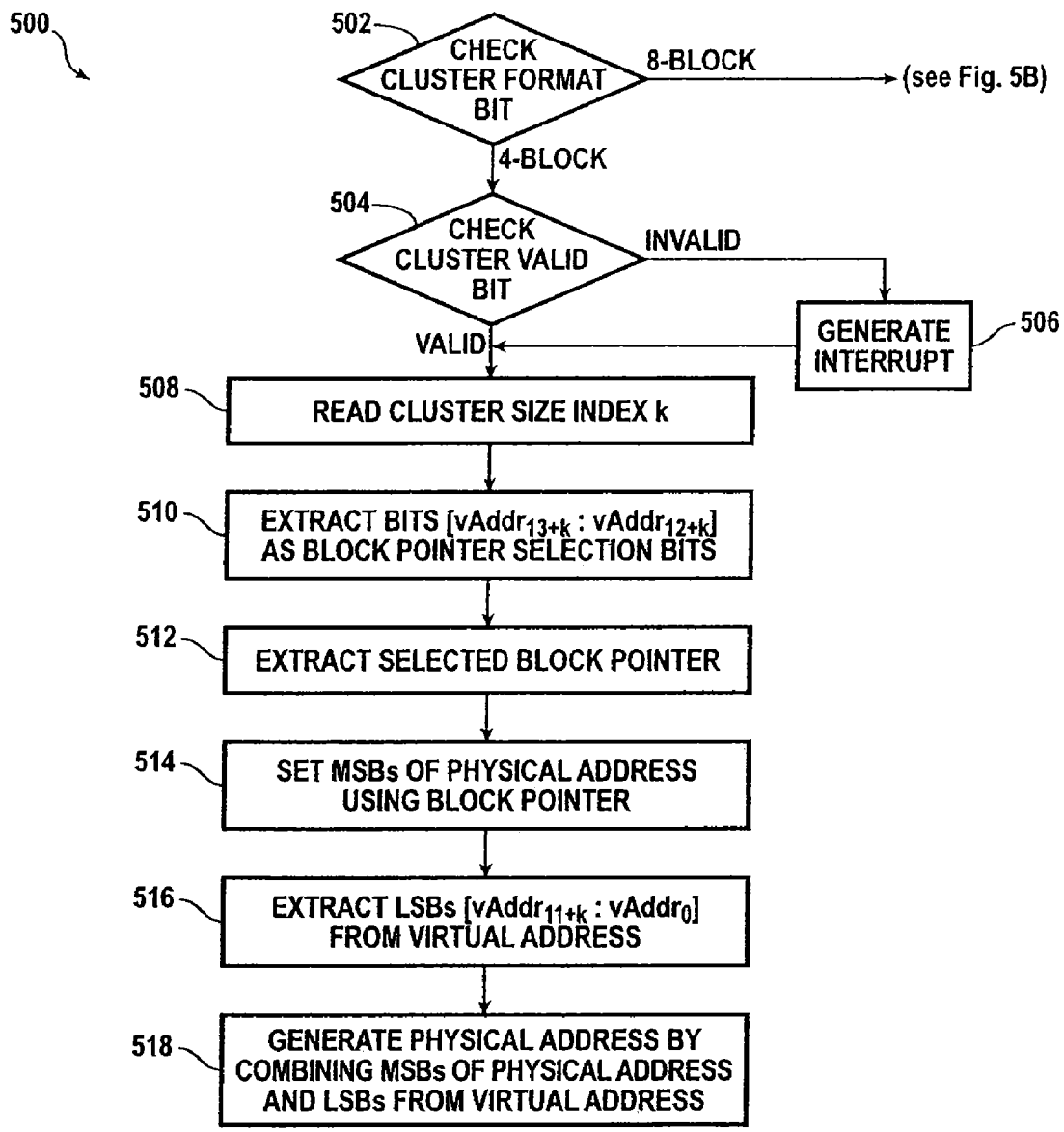
FIGS. 5A-B are flow diagrams of a process for translating a virtual address given a corresponding cluster according to an embodiment of the present invention.

FIG. 5A illustrates a process 500 for translating a virtual address (vAddr) given a corresponding cluster, where the cluster may have either of the formats shown in FIGS. 4A-B. The corresponding cluster may be obtained, e.g., from an in-memory cluster table by using an index derived from the virtual address vAddr, as described above with reference to FIG. 3.

At step 502, the cluster format field is checked to determine whether the cluster is a four-block cluster 400 or an eight-block cluster 450. Processing steps for an eight-block cluster 450 are described below with reference to FIG. 5B. For a four-block cluster 400, the valid bit is checked at step 504. An invalid cluster may cause an "invalid page request" or other appropriate interrupt to be generated at step 506 without otherwise affecting processing. At step 508, a size index k (in this embodiment $0 \leq k \leq 7$) is determined by reading size field 402 of cluster 400.

At step 510, two block pointer selection bits are extracted from the virtual address vAddr for use in selecting one of the four block pointers 410 in the cluster 400. Because block size is variable, which bits are used depends on the size index k. As described above, block pointer 410(0) should be used if the virtual address vAddr is in the first quarter of the range mapped by cluster 400 and so on. Accordingly, the two block pointer selection bits are those bits of vAddr that correspond to dividing the range of virtual addresses mapped by the cluster into quarters. For example, if the size index k is 0 (4 KB blocks), each block is one page (4 KB), and the block pointer is selected by bits in vAddr corresponding to page-size units (e.g., $[vAddr_{13}:vAddr_{12}]$). If the size index k is 1 (8 KB blocks), each block is two pages, and the block pointer is selected by bits in vAddr that correspond to two-page units (e.g., $[vAddr_{14}:vAddr_{13}]$). More generally, in this embodiment, the block pointer selection bits for a cluster 400 having size index k are given by $[vAddr_{13+k}:vAddr_{12+k}]$.

At step 512, the block pointer selection bits are interpreted as a number from 0 to 3 to select the corresponding 24-bit block pointer 410(0), 410(1), 410(2), or 410(3). At step 514, the selected block pointer is used to generate the 24 MSBs of a base physical address (pAddr). In one embodiment, the 24 bits $[pAddr_{35}:pAddr_{12}]$ are set equal to the corresponding bits of the selected block pointer 410, and the remaining bits of pAddr $[pAddr_{11}:pAddr_0]$ are initialized to zero. At step 516, the 12+k LSBs of the virtual address vAddr, corresponding to an offset within the block of size index k, are extracted.

At step 518, the physical address is generated by combining the MSBs of the physical address generated at step 514 with the LSBs $[vAddr_{11+k}:vAddr_0]$ of the virtual address. For example, in one embodiment, blocks are naturally aligned in the system physical address space (i.e., blocks of size 4 KB start at 4 KB boundaries of the address space, blocks of size 8 KB start at 8 KB boundaries, and so on). In this embodiment, for a cluster of size index k, only the 24−k MSBs of the block pointer are of interest, since the rest would be zero by the alignment rules. Accordingly, the physical address can be generated by setting bits $[pAddr_{35}:pAddr_{12+k}]$ to the corresponding number of MSBs of the block pointer and setting bits $[pAddr_{11+k}:pAddr_0]$ to the corresponding number of LSBs of the virtual address. In another embodiment, the LSBs $[vAddr_{11+k}:vAddr_0]$ of the virtual address are added to the physical address generated at step 514. Other techniques for generating the physical address may also be used.

Figure 5B:
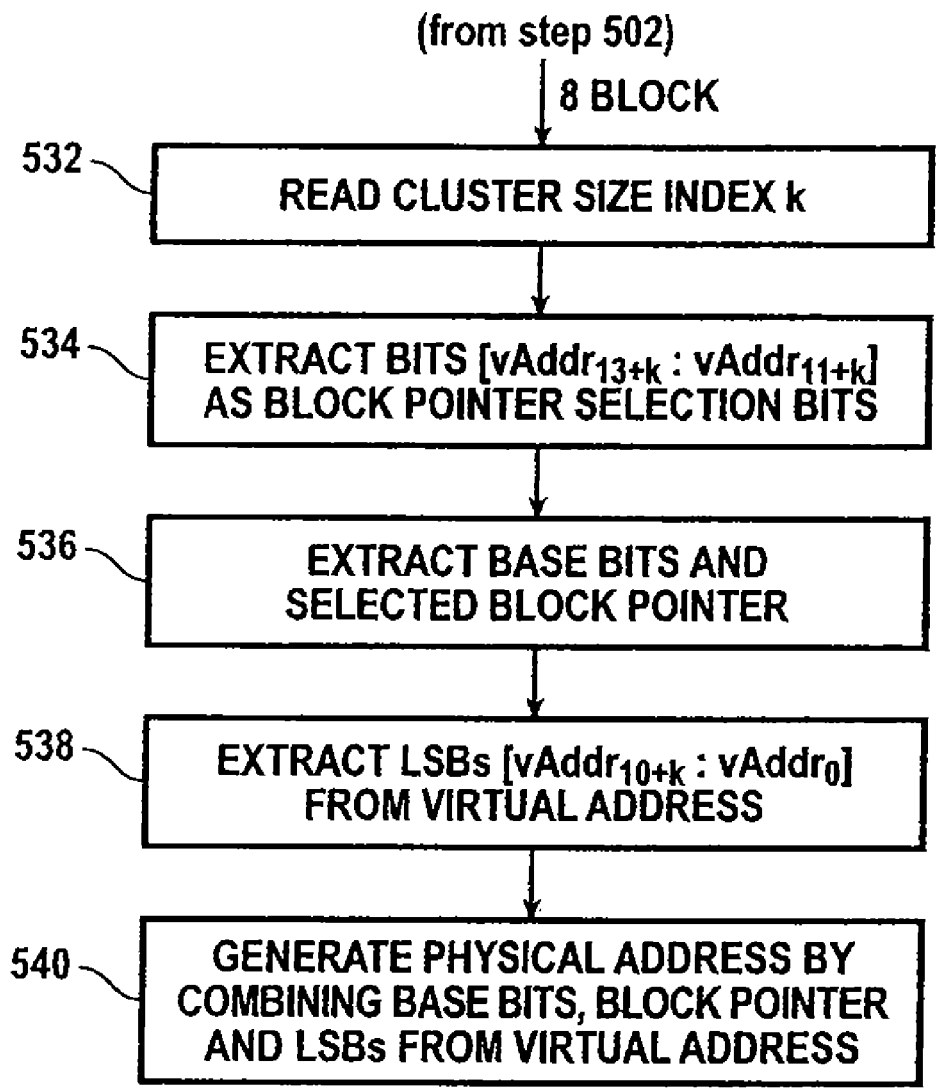

Returning to step 502, if the cluster is an eight-block cluster 450, the processing is shown in FIG. 5B. At step 532, a size index k (in this embodiment $1 \leq k \leq 7$) is determined by reading size field 452 of cluster 450. At step 534, three block pointer selection bits are extracted from the virtual address vAddr for use in selecting one of the eight block pointers 460. As with four-block clusters, because block size is variable, which bits are extracted depends on the size index k. As described above, block pointer 460(0) should be used if the virtual address vAddr is in the first eighth of the range mapped by cluster 450 and so on. Accordingly, the three block pointer selection bits are those bits of vAddr that correspond to dividing the region of virtual address space mapped by the cluster into eighths. For instance, if the size index 452 is 1 (4 KB blocks), each block is one page (4 KB), and the block pointer is selected by bits in vAddr that correspond to one-page units (e.g., $[vAddr_{14}:vAddr_{12}]$). If the size index 452 is 2 (8 KB blocks), each block is two pages, and the block pointer is selected by bits in vAddr that correspond to two-page units (e.g., $[vAddr_{15}:vAddr_{13}]$). More generally, in this embodiment, the block pointer selection bits for an eight-block cluster 450 having size index k are given by $[vAddr_{13+k}:vAddr_{11+k}]$.

At step 536, the block pointer selection bits are used to select one of the eight fourteen-bit block pointers 460, and the ten-bit base pointer 458 is also extracted. At step 538, the 11+k least significant bits of virtual address vAddr, corresponding to an offset within the block of size index k, are extracted. At step 540, a physical address is generated by combining the base pointer (Base), the block pointer (Block), and the LSBs of the virtual address. This combination can be made in various ways.

For example, in one embodiment, the physical address is obtained by: (1) dropping the k−1 LSBs of the base address; (2) using the remaining bits of the base address $[Base_9:Base_{k-1}]$ as the MSBs of the physical address $[pAddr_{35}:pAddr_{25+k}]$; (3) concatenating the fourteen block pointer bits $[Block_{13}:Block_0]$ as bits $[pAddr_{24+k}:pAddr_{11+k}]$; and (4) concatenating the 11+k LSBs of the virtual address $[vAddr_{10+k}:vAddr_0]$ as bits $[pAddr_{10+k}:pAddr_0]$.

In another embodiment, the physical address is obtained by: (1) using the ten bits of the base address as the MSBs of a block starting address; (2) using the fourteen bits of the base pointer as the remaining bits of the block starting address; and (3) adding the 11+k LSBs of the virtual address as an offset to the block starting address.

In yet another embodiment, the physical address is obtained by a shifting procedure that includes: (1) aligning the ten bits of the base pointer [$Base_9$:$Base_0$] at the ten MSBs of a first 24-bit field (BF1) [$BF1_{28}$:$BF1_{14}$]; (2) shifting the block pointer left by k–1 bits in a second 24-bit field (BF2) so that the block pointer occupies [$BF2_{12+k}$:$BF2_{k-1}$] and the other bits of field BF2 are zero; (3) adding the bit fields BF1 and BF2 to obtain the 24 MSBs of the starting physical address; and (4) adding the 11+k LSBs of the virtual address as an offset. In a variation of this embodiment, a shift limit (M) is imposed. In this variation, the block pointer is shifted left by k–1 bits only if k–1≦M. If k–1 exceeds M, then the block pointer is shifted left by M bits.

More generally, any suitable combination of drop, shift, concatenation, and arithmetic operations may be performed on the base address, block pointer and virtual address bits to obtain the translation. In some embodiments, selection of a translation operation may depend on size index k.

It is to be understood that the address translation processes described herein are illustrative and that variations and modifications are possible. Steps described as sequential may be executed in parallel, order of steps may be varied, and steps may be modified or combined. While specific translation operations have been described in connection with particular cluster formats, those skilled in the art will recognize that a variety of other translation operations adapted to other cluster formats (including the sixteen-block format described above) may also be implemented within the scope of the invention.

D. Creation of Clusters

Specific processes for creating clusters and updating cluster table 302 will now be described. As described above, a cluster stored in a cluster table entry provides data (e.g., address bits) for translating virtual addresses to physical addresses, and the range of virtual address space mapped by a particular cluster (referred to herein as "range size") is variable. FIG. 3 illustrates that the same cluster (e.g., CLUS 0) may be stored in multiple cluster table entries (e.g., entries 304(1)-304(4)) of cluster table 302. This arrangement allows each cluster to be obtained from cluster table 302 by reference to any virtual address mapped by that cluster; thus, the correct cluster for a particular translation can be obtained with one table access operation without advance knowledge of range sizes or boundaries.

Range sizes are established as clusters are created and added to the cluster table. In one embodiment for a graphics processing system, virtual address management and cluster creation are handled by a resource manager program (or graphics driver program) that manages a pool of physical memory. During system initialization, the resource manager requests an initial memory allocation (e.g., 8 to 64 MB) from system memory and places it into the pool. The resource manager then receives memory allocation requests from its clients (e.g., graphics driver programs) and allocates the requested memory from its pool, returning corresponding virtual addresses to the requesting client. If the amount of free memory in the pool is insufficient, the resource manager may request an additional increment of physical memory for the pool. Creation of clusters, which define mappings of virtual addresses to physical addresses, can occur when memory is added to the pool or as allocation requests are received.

Figure 6:
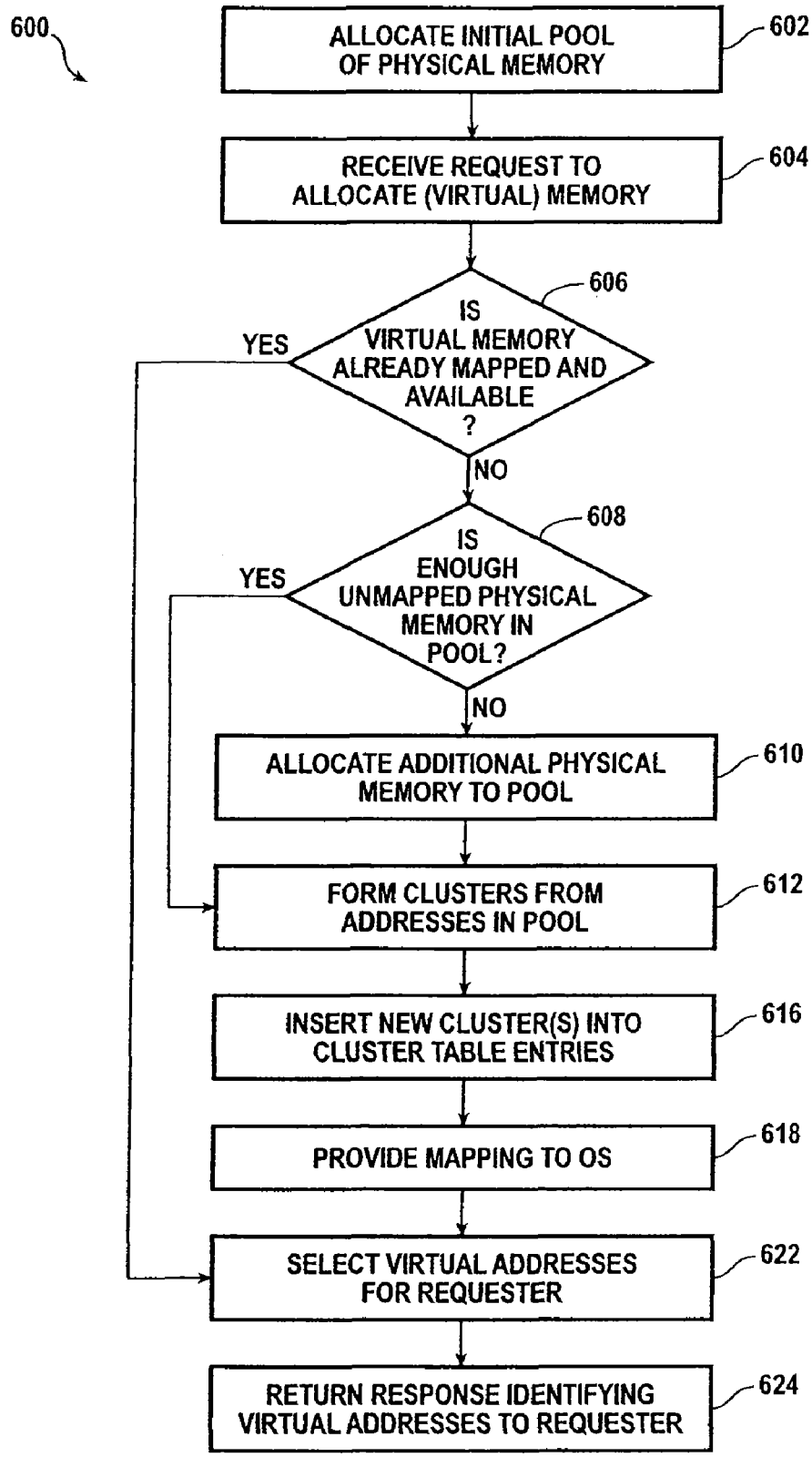
FIG. 6 is a flow diagram of a process for managing a virtual address space according to an embodiment of the present invention.

More specifically, FIG. 6 is a flow diagram of a process 600 that the resource manager may use to manage a virtual frame buffer, where the virtual frame buffer includes a physical memory pool and a corresponding virtual address space. At step 602, a pool of physical memory is created by requesting an initial memory allocation from an operating system (OS), e.g., during system startup. In one embodiment, this initial allocation is large, e.g., 8-64 MB, with a specific value being selected based on anticipated demand for memory resources by clients of the resource manager. In another embodiment, the initial allocation is relatively small, e.g., an amount sufficient to initialize the graphics system such as 2 MB or less, with additional requests being made in response to demand from clients of the resource manager. The allocated physical memory may become unavailable to the rest of the system, although it is not yet usable by clients of the resource manager. In some embodiments, clusters that define mappings between some or all of this memory and the virtual address space may be created in anticipation of allocation requests; any such cluster creation may be done in accordance with processes described below.

At step 604, the resource manager receives a memory allocation request from a requester (or client), e.g., a driver or application process. Such requests may occur when a new process that uses the graphics processing system is initiated or at other times during the operation of such processes, as is known in the art. The requester may be unaware that the frame buffer is implemented as a virtual frame buffer, so that from the requester's perspective, the request and response may be indistinguishable from the case of a non-virtual frame buffer.

At step 606, the resource manager determines whether a sufficiently large block of virtual memory is already mapped and available (i.e., not already allocated to a previous requester). If not, then at step 608, the resource manager determines whether a sufficient amount of unmapped physical memory is available in its pool. In some embodiments, determining the sufficiency of the unmapped physical memory includes setting a threshold that depends in part on the size of the request and in part on other considerations such as the minimum size of a cluster. For instance, where the minimum cluster size is 16 KB, if a client requests 1 KB at a time when the pool contains 4 KB, the amount of memory in the pool would be considered insufficient because no clusters can be created.

If, at step 608, sufficient physical memory is not available, the resource manager allocates an additional increment of physical memory at step 610. In one embodiment, this increment is at least large enough to fulfill the current request and may be larger. In another embodiment, the increment is always a fixed size (e.g., 2 MB, 8 MB, or 16 MB), and multiple increments are allocated at step 608 if needed to fulfill a particular request.

Allocation at step 610 may involve a conventional request to the OS, and in some embodiments, an allocation request returns a list or other collection of pointers to physical memory addresses for a suitable number of pages. It is not required that the returned pointers be in any particular order, and the pointed-to pages may be fragmented to any degree.

At step 612, once a sufficiently large amount of unmapped physical memory has been allocated, the resource manager forms clusters that map the physical addresses for some or all of the unmapped physical memory. In one embodiment, the clusters may be in any combination of cluster formats, e.g., the four-block, eight-block or sixteen-block cluster formats described above. Various techniques may be used to form clusters from the physical addresses; examples are described below. In some embodiments, cluster formation continues until the amount of physical memory remaining in the pool is too small to create another cluster; in other embodiments, cluster formation stops once enough clusters have been created to map a sufficient amount of memory to satisfy the current request, leaving the rest of the unmapped memory available for future cluster formation.

At step 616, the new clusters are inserted into entries of the cluster table. For example, in an embodiment where each cluster maps at least 16 KB of virtual address space, each cluster is inserted at a 16 KB virtual address boundary. Each cluster is inserted at one or more entries corresponding to the virtual addresses that it maps, e.g., as shown in FIG. 3. It will be appreciated that the number of entries containing a particular cluster is determined by the range size of the cluster; for instance, a cluster of FIG. 4A (or FIG. 4B or 4C) that has size index k would be inserted at $2^k$ entries. For example, in cluster table 302, a cluster with a range size of more than 16 KB (e.g., CLUS 0) is inserted at the entry corresponding to the first address it maps and every following entry within its range. Note that the position of the cluster in the table determines which virtual addresses are mapped to the physical addresses referenced by the cluster; accordingly, newly created clusters can be placed in the cluster table at any convenient position. For example, in some embodiments, clusters may be aligned at natural virtual address boundaries corresponding to the range size of the cluster (e.g., the first address mapped by a 16 KB cluster is aligned at a 16 KB boundary, the first address mapped by a 32 KB cluster is aligned at a 32 KB boundary, and so on). When a group of clusters is created, the clusters may be re-ordered to comply with such a rule, or with any other alignment rules that may be implemented; in general, the order of clusters in the cluster table need not correspond to the order in which the clusters were created.

At step 618, the mapping between virtual addresses and physical addresses is provided to the OS for use in the OS page table. An appropriate OS function call, examples of which are known in the art, may be used. In one embodiment (e.g., where the OS is Microsoft Windows), the resource manager sends a request for the desired mapping to the operating system using a standard OS function call. Providing the mapping to the OS, which is optional, enables application or OS programs to access the mapped memory without sending memory requests through the graphics subsystem. For instance, as is known in the art, in systems where tiled memory addressing is used for pixel data, it can be useful to define a region within the system address space (referred to in the art as an "aperture") for addressing the tiled pixel data. For memory requests targeting any system address within the aperture, a tiling transform is applied so that CPU and GPU will access the same physical memory locations in the same pattern.

In embodiments of the present invention, a tiling aperture can be supported either by routing all memory access requests for addresses within the aperture through the graphics system or by providing the appropriate mapping to the OS page table so that the CPU can perform the thing transform and access the tiled memory directly. In instances where direct CPU access to the mapped memory is not desired, step 618 may be omitted.

At step 622, once clusters have been defined for a sufficient amount of the virtual address space, a range of virtual addresses to be allocated to the requester is selected. The resource manager may simply select the next unused virtual addresses, or it may select virtual addresses based on the client and/or intended use of the allocated space (e.g., the first 2 MB of virtual address space could be reserved for a pixel buffer). It should be noted that the range of virtual addresses selected at step 622 need not align with cluster boundaries or with block boundaries within a cluster. For example, virtual addresses for only part of a cluster or parts of several clusters might be selected for allocation to the requester. Various techniques for selecting addresses to satisfy a memory allocation request are known in the art and may be employed at step 622.

At step 624, a response is returned to the requester. The response may include an identifier of the starting virtual address for the allocated range. This identifier is advantageously provided in a form that can be used in a conventional fashion; the requester may be unaware of clusters or other details of the virtual frame buffer implementation.

Figure 7:
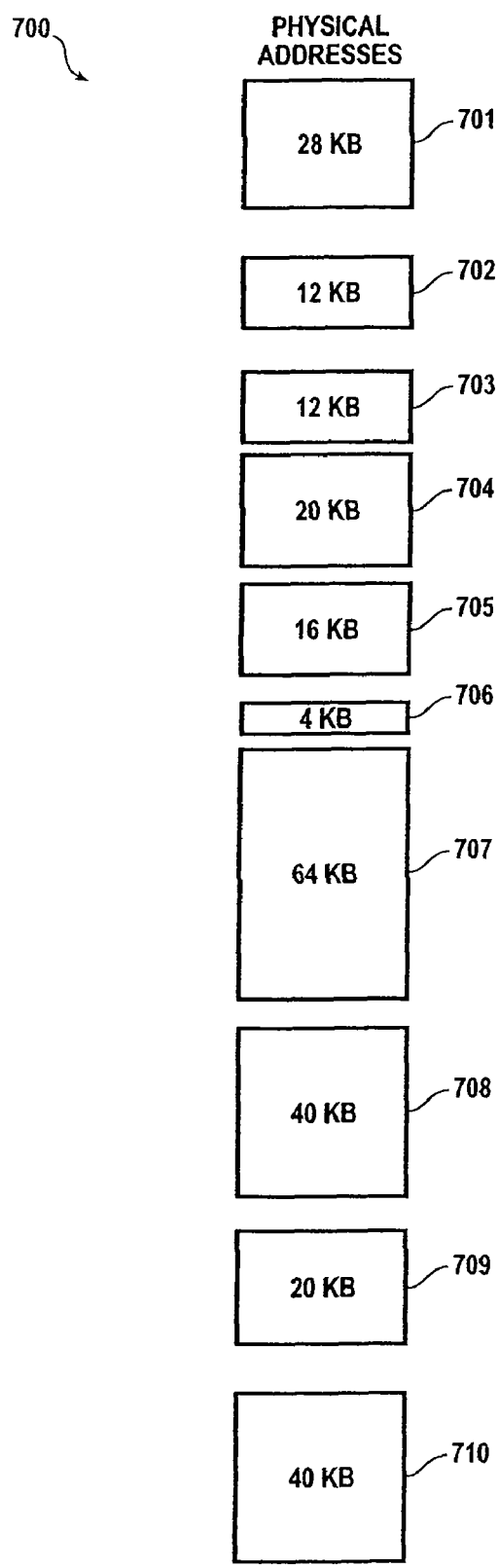
FIG. 7 illustrates a fragmented pool of physical addresses according to an embodiment of the present invention.

Examples of techniques for forming clusters from physical addresses will now be described. As described above, the physical memory allocation received from the OS in response to a request may be highly fragmented; as a result, the pool of unmapped memory also tends to be fragmented, even where the pool includes memory from multiple allocation requests. FIG. 7 illustrates an example of a fragmented memory pool 700 that includes ten groups 701-710 of contiguous physical addresses. The size of each group (in KB) is indicated; in this example, sizes range from 4 KB (one page) to 64 KB (sixteen pages). The gaps separating groups may also be of any size.

As used herein, cluster formation refers generally to creation of clusters given a fragmented pool of physical addresses such as pool 700. In embodiments where it is desirable to minimize the number of clusters required to map a given range of virtual address space, cluster formation processes are advantageously optimized to form fewer clusters with larger range sizes to the extent possible. In the cluster formats described above, each cluster contains references to multiple blocks of contiguous physical addresses; different blocks in one cluster might or might not be contiguous. For instance, in FIG. 3, CLUS 0 contains references to blocks 314(6) and 314(7) that are contiguous with each other and also contains references to blocks 314(15) and 314(20) that are not contiguous with each other or with blocks 314(6) and 314(7). Clusters with larger range sizes can be made either by using larger blocks or by including more blocks per cluster (or by doing both); for instance, a four-block cluster with 16 KB blocks and a sixteen-block cluster with 4 KB blocks have the same range size (64 KB).

In some embodiments, the cluster formation process may operate on the pointers returned by the OS; in other embodiments, a different representation of the available physical addresses may be used. In either case, to facilitate the identification of blocks of contiguous addresses for inclusion in a cluster, a cluster formation process may advantageously begin by sorting the pool based on physical address and identifying groups of contiguous physical addresses. To the extent that pages can be independently allocated by the OS, a group may be any size that is a multiple of the page size (e.g., group 701 is 28 KB), and there is no necessary relationship between the sizes of any two groups. It is to be understood that the groups represent a preliminary identification of how blocks might be formed, and that blocks may be formed using all or part of a group. For instance, in an embodiment where the allowed block sizes are $2^N$ pages, a group whose size is not an allowed block size (e.g., group 701) would need to be split. As another example, a group whose size is an allowed block size (e.g., group 707) might also be split if a cluster cannot be formed using the entire group. Further, in some embodiments, alignment constraints may limit the starting address of a block, which may entail further splitting of some groups.

Processes for forming clusters will now be described. By way of illustration, reference is made to pool 700 of FIG. 7 and the cluster formats described above with reference to FIGS. 4A-C. It is to be understood that the processes described herein are not limited to any particular memory pool, degree of fragmentation, or cluster format(s).

Figure 8:
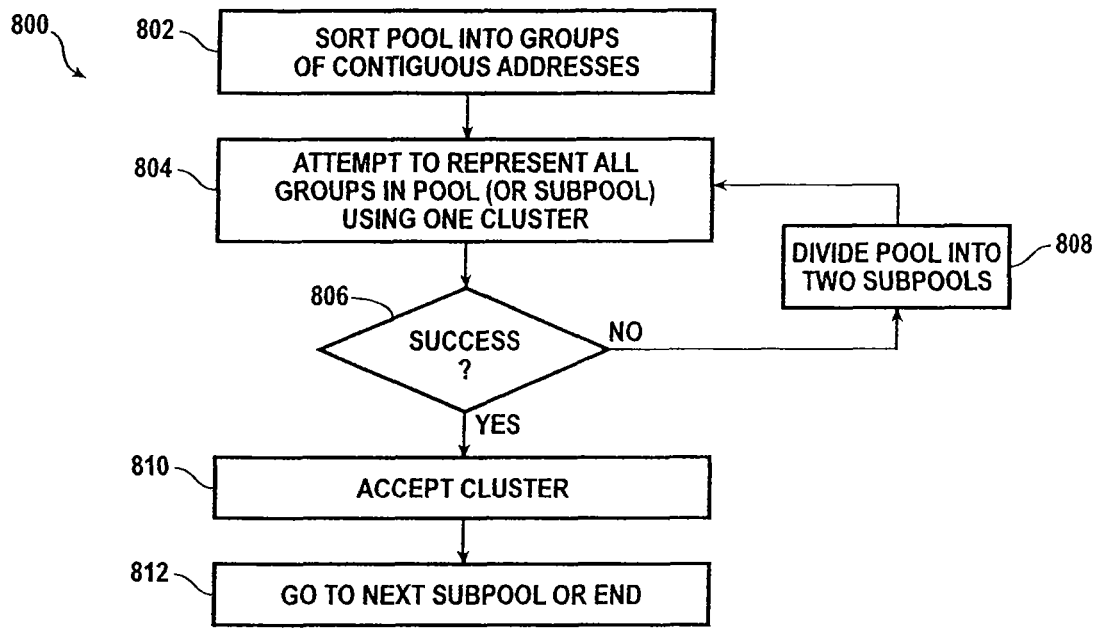
FIG. 8 is a flow diagram of a first process for forming clusters from physical addresses according to an embodiment of the present invention.

FIG. 8 is a flow diagram of a first process 800 for forming clusters. Process 800, which may be implemented at step 612 of process 600 (FIG. 6), is designed to map as much of the pool as possible with a single cluster.

At step 802, the pool is sorted into groups of contiguous physical addresses, e.g., as shown in FIG. 7. At step 804, an attempt is made to represent all of the groups using a single cluster. For instance, using the four-block cluster format of FIG. 4A, the attempt would succeed if the pool contains four groups of equal size. For pool 700 (FIG. 7), this is not the case.

At step 806, if the attempt is unsuccessful, the resource manager separates the unmapped physical addresses into two subpools at step 808 and returns to step 804 to attempt to represent one of these subpools using a single cluster.

Division into subpools (step 808) is advantageously implemented in a way that maximizes the likelihood of forming a cluster on the next iteration and can be based in part on physical address order. For example, in one embodiment, each group that is not an allowed block size might be split into two subgroups, where the size of the first subgroup is the largest allowed block size that does not exceed the group size. For example, in FIG. 7, group 701 might be split into a 16 KB subgroup and a 12 KB sub-group. Group 707 would not be split. Subgroups that are of an allowed block size may be collected into a first subpool while the remaining subgroups are collected into a second subpool.

Figure 9:
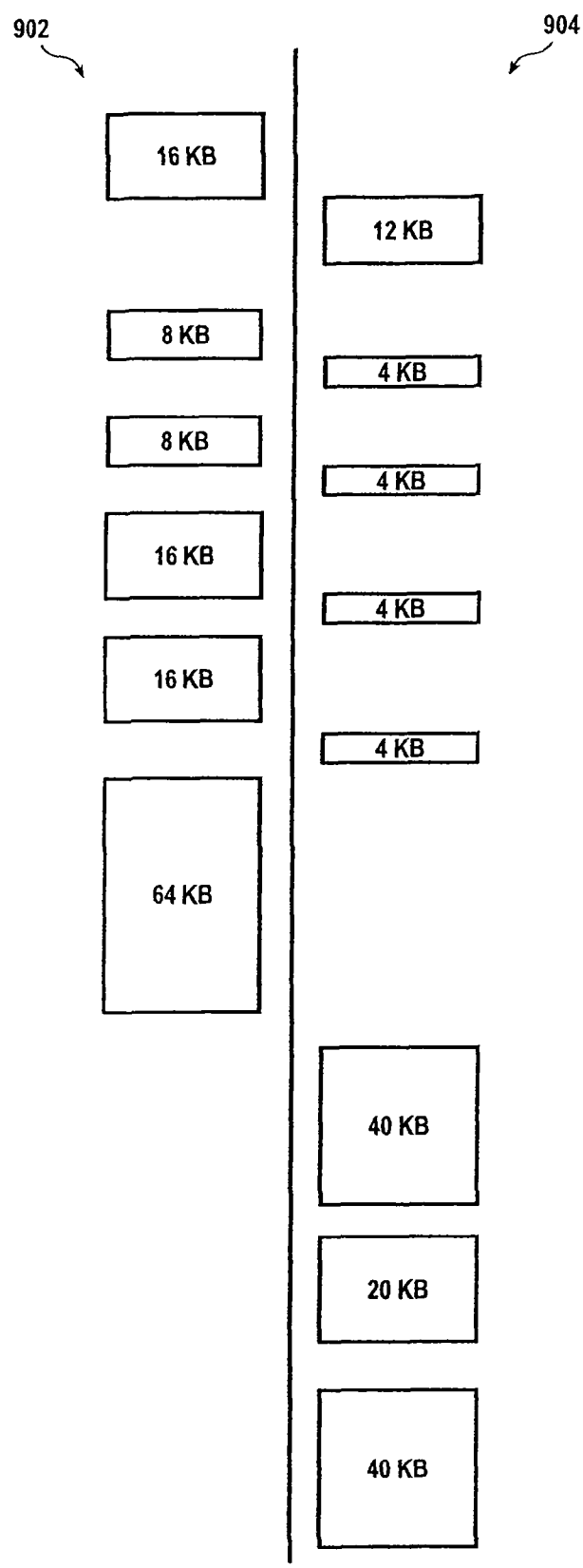
FIG. 9 illustrates subpools that may be created during the process shown in FIG. 8.

The two subpools need not contain equal amounts of memory, although in some embodiments, such a constraint might be imposed. For instance, the first subpool might be formed by selecting, in physical address order, groups (or subgroups) that are of an allowed block size until the first subpool contains at least half of the memory in the total pool; if the first subpool exceeds half, the smallest groups (or subgroups) are shifted to the second pool until the division is equal (or nearly equal). FIG. 9 illustrates an example of subpools 902, 904 that might be created from pool 700 of FIG. 7.

After division into subpools, one of the subpools is selected, and (step 804) an attempt is made to represent that subpool using a single cluster. Iteration of steps 804, 806, and 808 for the first selected subpool may continue until all of the subpool has been mapped or until a collection of new clusters large enough to fulfill the current request has been generated. For example, in FIG. 9, subpool 902 could be mapped as a sixteen-block cluster (FIG. 4C) with a block size of 8 KB, assuming that the physical addresses satisfied any locality constraint (e.g., common MSBs) applicable to sixteen-block clusters. If an applicable locality constraint is not satisfied, further subdivision of subpool 902 would be required.

At step 810, once the pool (or a subpool) has successfully been represented using one cluster, the cluster is accepted, and the physical addresses for that cluster are removed from the pool. Process 800 may then proceed to map another subpool or end (step 812). For example, process 800 may continue to map subpools until at least enough memory has been mapped to satisfy the current request or until all allocated memory in the pool has been mapped.

It will be appreciated that process 800 is illustrative and that variations and modifications are possible. Steps described as sequential may be executed in parallel, order of steps may be varied, and steps may be modified or combined. In some embodiments, rather than subdividing a group at step 808, the combination of groups or subgroups making up a subpool might be changed (e.g., by shifting a group from one subpool to another).

Figure 10:
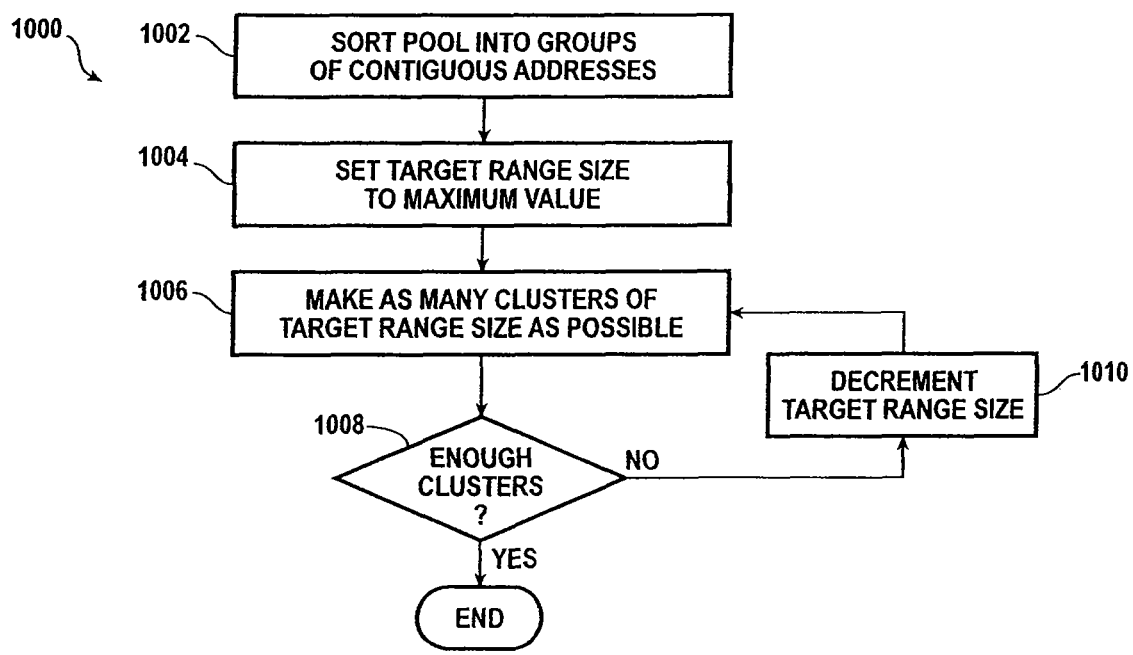
FIG. 10 is a flow diagram of a second process for forming clusters from physical addresses according to an embodiment of the present invention.

FIG. 10 is a flow diagram of a second process 1000 for forming clusters. Process 1000, which may be implemented at step 612 of process 600 (FIG. 6), is designed to form large clusters first, then to form smaller clusters from groups that cannot be used to make large clusters.

At step 1002, the pool is sorted into groups, e.g., as shown in FIG. 7. At step 1004, a target cluster range size $S_{targ}$ (which may be defined, e.g., in bytes or pages) is set to the maximum value, which advantageously corresponds to the largest supported cluster size or the total size of the pool, whichever is smaller. For example, pool 700 of FIG. 7 contains a total of 256 KB of memory; accordingly $S_{targ}$ may initially be set to 256 KB.

At step 1006, as many clusters as possible of the target range size $S_{targ}$ are created. In one embodiment, four-block clusters of target range size $S_{targ}$ are created if four blocks, each of size $S_{targ}/4$, can be formed from the pool; eight-block clusters if eight blocks, each of size $S_{targ}/8$, can be formed; and sixteen-block clusters if sixteen blocks, each of size $S_{targ}/16$, can be formed. Blocks can be formed from all or part of any of the groups in the pool; if a part of a group is used, that part is advantageously taken from either the beginning or end of the group. Physical addresses (or pointers) are removed from the pool as clusters are created, so that at most one cluster will map to a given physical address.

At step 1008, it is determined whether enough clusters have been created to satisfy the current request. If not, then at step 1010, the target range size is decremented to the next smaller size, and process 1000 returns to step 1006 to form clusters of the new target size, using any pointers that have not already been incorporated into clusters. Iteration of steps 1006, 1008, and 1010 may continue until enough memory has been mapped to satisfy the current requests or until the entire pool has been mapped. At step 1012, once enough memory has been mapped, process 1000 ends.

Figure 11A:
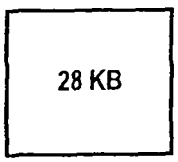
FIGS. 11A-B illustrate clusters that may be created during the process shown in FIG. 10.
Figure 11A:
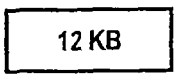
Figure 11A:
Figure 11A:
Figure 11A:
Figure 11A:
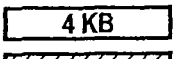
Figure 11A:
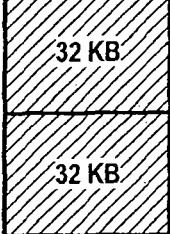
Figure 11A:
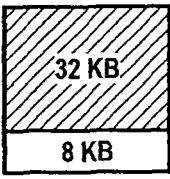
Figure 11A:
Figure 11A:
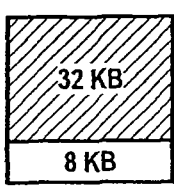
Figure 11A:
Figure 11B:
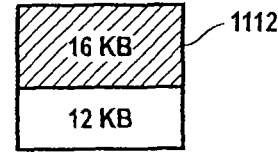
Figure 11B:
Figure 11B:
Figure 11B:
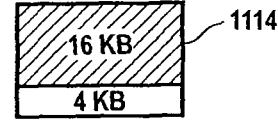
Figure 11B:
Figure 11B:
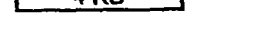
Figure 11B:
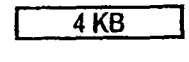
Figure 11B:
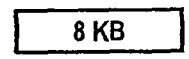
Figure 11B:
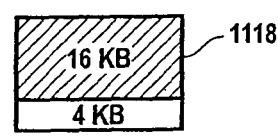
Figure 11B:
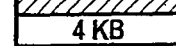
Figure 11B:
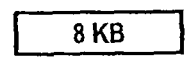

FIGS. 11A-B illustrate an application of process 1000 to pool 700 (FIG. 7) in an embodiment where only the four-block cluster format of FIG. 4A is used. For an initial $S_{targ}$=256 KB (step 1004), there are not four blocks of size 64 KB (step 1006), so no clusters are created. Accordingly, at step 1010, $S_{targ}$ is reduced to the next smaller size, 128 KB. On the next iteration of step 1006, four blocks of 32 KB each are formed, as shown in FIG. 11A. A cluster encoding these four blocks 1102, 1104, 1106, 1108 is created, and blocks 1102, 1104, 1106, 1108 are removed from the pool (as indicated by hatching). In this example, only one 128 KB cluster can be made.

If more than 128 KB were needed (step 1008), $S_{targ}$ would be reduced (step 1010) to the next smaller range size, 64 KB and four blocks of 16 KB each would be formed from the remaining pool as shown in FIG. 11B. A cluster encoding blocks 1112, 1114, 1116, 1118 would be created, and blocks 1112, 1114, 1116, 1118 would be removed from the pool. Proceeding in a similar manner, further clusters—e.g., one cluster of range size 32 KB and two clusters of range size 16 KB—could also be formed if desired.

It will be appreciated that process 1000 is also illustrative and that variations and modifications are possible. Steps described as sequential may be executed in parallel, order of steps may be varied, and steps may be modified or combined. In some embodiments, cluster formation continues until all physical addresses in the pool have been mapped; in other embodiments, only an amount of memory sufficient for the current request is mapped, leaving open the possibility that a later allocation may fill gaps in the pointer sequence and allow the formation of larger clusters.

Figure 12:
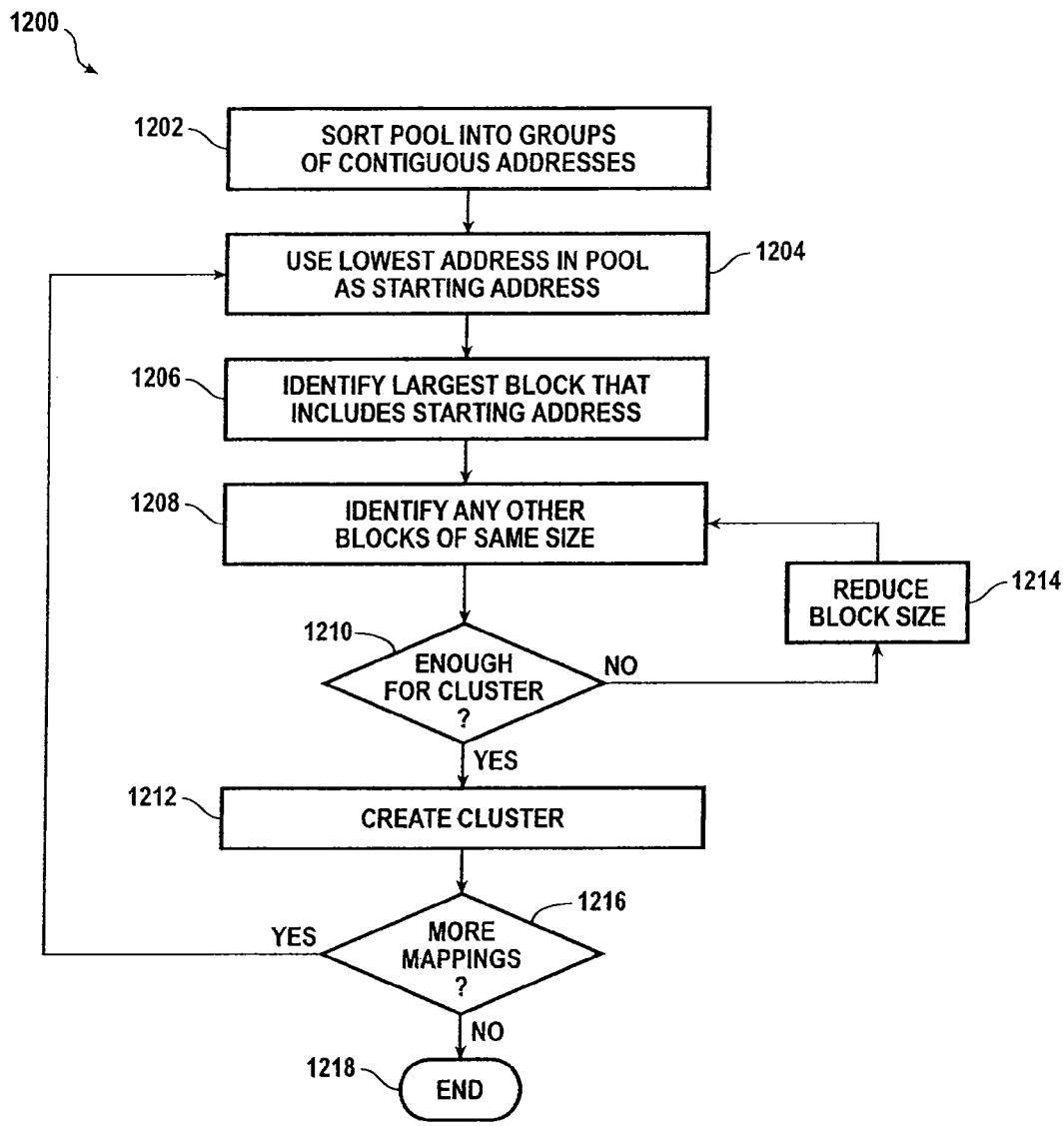
FIG. 12 is a flow diagram of a third process for forming clusters from physical addresses according to an embodiment of the present invention.

FIG. 12 is a flow diagram of a third process 1200 for forming clusters in which the clusters are formed by starting with the first block in physical address order and finding other blocks of the same size.

At step 1202, the pool is sorted into groups, e.g., as shown in FIG. 7, based on physical addresses. At step 1204, the lowest unmapped physical address is found. At step 1206, the size of the largest block that can be made starting with that physical address is chosen as a target size. At step 1208, any other blocks of the target size that can be extracted from the pool are identified. At step 1210, it is determined whether there are enough blocks of the target size to form a cluster; if so, then the cluster is formed at step 1212. For example, where four-block, eight-block and sixteen block cluster formats are available, a cluster may be formed if there are at least four blocks of the target size. If eight or sixteen blocks are available and any locality constraints are satisfied, then clusters in these formats may be formed; for a given block size, including more blocks in the cluster increases the range size of the cluster.

If, at step 1210, not enough blocks of the target size are available, then at step 1214 the target size is decreased to the next smaller size, and process 1200 returns to step 1208 to identify blocks of the new target size and determine whether a cluster can be formed. Steps 1208, 1210 and 1214 can be iterated until a cluster is formed. As each cluster is formed, physical addresses associated with that cluster are removed from the pool.

At step 1216, it is determined whether enough of the pool has been mapped. As is the case for other processes described herein, creation of clusters may involve mapping the entire pool or enough of the pool to satisfy a current request. If further mapping is needed, process 1200 returns to step 1204 to find the next lowest unmapped address. Once enough of the pool has been mapped, process 1200 ends (step 1218).

It will be appreciated that process 1200 is illustrative and that variations and modifications are possible. Steps described as sequential may be executed in parallel, order of steps may be varied, and steps may be modified or combined.

In other embodiments, cluster formation is based in part on properties of the physical memory device. As is known in the art, many memory devices are subdivided into multiple banks; memory requests directed to different banks are allowed to overlap while memory requests directed to the same bank are not. Where such devices are used, certain bits of the physical address (e.g., low-order bits) provide a bank identifier.

In some embodiments of the present invention, cluster formation takes into account the bank identifier of the first address in a block or group. For example, blocks identified during any of the above processes 800, 1000, 1200 may be selected for a cluster or arranged within a cluster such that adjacent blocks in the cluster start with addresses from different banks. Thus, in FIG. 11A, the order of blocks 1102, 1104, 1106, 1108 within a cluster might be determined based on the respective bank identifiers of the first physical addresses in the blocks. In another instance, if more blocks of a given size exist than can be included in one cluster, selection of which blocks to include in one cluster might be based in part on bank identifiers. Selection or ordering of blocks based on bank identifiers can be used to obtain a desirable interleaving of memory locations from different banks in the virtual address space.

In other embodiments, cluster formation is also based in part on likely patterns of use of the virtual addresses being defined. As described in detail in application Ser. No. 10/769, 326, parent of the present application, clusters can be cached in an address translation system, and such caching tends to be more beneficial when the pattern of memory accesses is such that the same cluster is accessed repeatedly. Accordingly, if the resource manager is provided with information indicating how the allocated memory is to be used, such information can be used during cluster creation. For example, in some graphics processing systems, the rasterizer operates on horizontal or vertical strips of tiles. If the clusters that cover the pixel buffer are formed such that blocks corresponding to adjacent files in a strip are in different banks, more efficient memory access is possible.

It is to be understood that the memory allocation and cluster formation processes described herein may be modified or varied. For a given embodiment, the algorithm used to define clusters for a given allocation of physical memory is generally dependent on cluster format. Alignment rules for starting addresses of physical memory blocks and/or starting virtual addresses of clusters may be established as desired.

In some embodiments, cluster formation may terminate when enough memory has been mapped to satisfy the current request. In such embodiments, the entire pool is advantageously made available for cluster creation to increase the likelihood of creating clusters with large range sizes, and the aggregate range size of the created clusters is advantageously not limited to the size of the current request. For example, if a request is for 8 KB, one cluster with range size 256 KB might be created; an 8-KB portion of the virtual address range covered by the cluster can be provided to the requester, with the remaining 248 KB of the virtual address range being reserved for subsequent requests.

To further facilitate management of the virtual address space, the resource manager may also maintain an allocation table that tracks whether a given virtual address has a cluster, whether it is allocated or available, and the like. Memory allocation tables of generally conventional design may be adapted for use in this context. Where the resource manager is able to define mappings for the virtual address space (i.e., create clusters) at a different time and with a different granularity than its allocations of virtual memory to clients, the likelihood of creating clusters with large range sizes increases.

III. Further Embodiments

While the invention has been described with respect to specific embodiments, one skilled in the art will recognize that numerous modifications are possible. For instance, cluster formats and sizes other than those described herein may be used. Clusters may map any number or arrangement of physical addresses, including any number of blocks of contiguous physical addresses. Any number and combination of cluster range sizes may be supported, and address translation may be implemented in a manner appropriate to the cluster format(s) in use. The arrangement of cluster storage in an in-memory cluster table may also be varied; in some embodiments, hierarchical in-memory table structures may be implemented. In other embodiments, each entry in the in-memory table may store multiple clusters, e.g., as described in application Ser. No. 10/769,326, parent of the present application. Some embodiments may also support cluster data structures of different sizes.

Embodiments of the invention may be employed in computer systems that use multiple physical page sizes concurrently. As an example, some systems provide for allocation of some memory in 4 KB increments and other memory in 1 MB increments. For purposes of defining clusters, the smaller size (e.g., 4 KB) can be used consistently as the page size of the physical address space, and the larger-size increments can be treated as cases where the system happened to provide a group of contiguous pages, e.g., a 1 MB page may be regarded as 256 consecutive 4 KB pages and may be divided into as many as 256 blocks.

Storage of the clusters in a flat cluster table in system memory as described above is also not required. In some embodiments, clusters can be stored using a hierarchical page table structure, and some or all of the hierarchical page table information may be stored on chip. One example of a hierarchical cluster table is described in application Ser. No. 10/769,326, parent of the present application. It is to be understood that other cluster table structures may also be used.

The virtual memory management system described herein may be used in connection with a wide variety of address translation systems. One such system is described in detail in application Ser. No. 10/769,326, parent of the present application. As described therein, clusters support efficient caching of a large portion of the virtual address mapping information using a relatively small number of cache entries. Those of ordinary skill in the art will appreciate that the present invention is not limited to any particular address translation system but may be used in any context where it is desirable to map memory using clusters (or other data structures) having a variable range size.

The logic described herein, including any alternative logic configurations, may be implemented using special-purpose circuitry designed and built according to any suitable technology, software (e.g., program code) executing on one or more programmable processors, and/or any combination thereof. Such circuitry may be integrated on the same chip or distributed across multiple chips as desired.

Computer programs incorporating various features of the present invention may be encoded on various computer readable media for storage and/or transmission; suitable media include magnetic disk or tape, optical storage media such as CD (compact disk) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the invention has been described in the context of graphics processing embodiments in a general purpose computer system, those of ordinary skill in the art will recognize that the systems and methods described herein are not restricted to this context. For example, similar systems and methods could be implemented in various special purpose computer systems (e.g., video game consoles). Further, similar systems and methods could be adapted for management of virtual address spaces used outside the graphics context, including virtual address spaces managed by CPUs or any other type of processor.

Thus, although the invention has been described with respect to specific embodiments, it will be appreciated that the invention is intended to cover all modifications and equivalents within the scope of the following claims.

What is claimed is:

1. A method for managing a virtual memory space, the method comprising:
   providing a pool of physical addresses;
   receiving a request for a virtual memory allocation from a client;
   creating a plurality of clusters from the pool, wherein each cluster represents a plurality of physical addresses selected from the pool and wherein the respective pluralities of physical addresses represented by different ones of the plurality of clusters correspond to different amounts of memory, and wherein different ones of the clusters include references to different numbers of blocks of contiguous physical addresses;
   removing from the pool the physical addresses represented by each cluster that is created;
   for each of the clusters, defining a mapped virtual address representing a mapping between a range of virtual addresses in the virtual memory space and the physical addresses represented by the cluster; and
   returning a reference to the mapped virtual address to the client.

2. The method of claim 1 wherein the act of providing a pool of physical memory includes:
   allocating memory from an operating system; and
   adding physical addresses for the allocated pool to the memory.

3. The method of claim 2 wherein the act of allocating memory from the operating system includes allocating an amount of memory that is independent of a size of the virtual memory allocation requested by the client.

4. The method of claim 1 wherein each cluster includes a format field indicating the number of block references included in that cluster.

5. The method of claim 1 wherein defining a mapping between a range of virtual addresses in the virtual memory space and the physical addresses represented by the cluster further comprises:
   adding an entry into a cluster table, the entry comprising a virtual address and a set of one or more physical addresses associated with the virtual address.

6. The method of claim 1 wherein defining a mapping between a range of virtual addresses in the virtual memory space and the physical addresses represented by the cluster further comprises:
   translating the virtual addresses from a tiled memory addressing memory space to a physical memory addresses using a tiling aperture.

7. A method for managing a virtual memory space, the method comprising:
   providing a pool of physical addresses;
   receiving a request for a virtual memory allocation from a client;
   iteratively forming clusters from the physical addresses for at least portion of the physical addresses, wherein forming clusters from the physical address includes:
      sorting the pool of physical addresses into groups of contiguous addresses;
      determining whether all groups in the pool can be represented by a same cluster;
      if all of the groups cannot be represented by the same cluster, dividing the pool into two subpools and iteratively forming clusters from each of the subpools;
      if all of the groups can be represented by the same cluster, accepting the cluster and removing from the pool the physical addresses represented by the cluster; and
   for each of the clusters, defining a mapped virtual address representing a mapping between a range of virtual addresses in the virtual memory space and the physical addresses represented by the cluster;
   selecting a range of mapped virtual addresses to be allocated to the client, the range of mapped virtual address being associated with one or more clusters; and
   returning a reference to the selected range of mapped virtual addresses to the client.

8. The method of claim 7 wherein each cluster comprises references to multiple blocks of contiguous physical addresses.

9. The method of claim 7 wherein the step of iteratively forming clusters is performed until at least enough memory has been mapped to satisfy the request for virtual memory allocation from the client or until the memory in the pool has been mapped.

10. The method of claim 7 wherein determining whether all groups in pool can be represented by a same cluster further comprises:
 determining if all of the groups in the pool have a same size.

11. The method of claim 10 wherein the size of each of the groups in the pool is a multiple of a page size associated with the pool of physical addresses.

12. The method of claim 7 wherein dividing the pool into two subpools further comprises:
 forming a first subpool from groups comprising a largest allowable block size that does not exceed a group size; and
 forming a second subpool from groups not included in the first subpool.

13. The method of claim 7 wherein dividing the pool into two subpools further comprises:
 forming a first subpool from groups comprising an allowed block size until the first subgroup includes at least half of the memory in the pool;
 forming a second subpool from groups not included in the first subpool,
 wherein the first subpool and the second subpool include approximately an equal amount of memory.

14. A method for managing a virtual memory space, the method comprising:
 providing a pool of physical addresses;
 receiving a request for a virtual memory allocation from a client;
 sorting the pool of physical addresses into groups of contiguous addresses;
 setting a target range size to a maximum threshold size;
 forming as many clusters from the groups of contiguous addresses as possible from the groups of contiguous addresses;
 removing from the pool the physical addresses represented by each cluster that is created;
 for each of the clusters, defining a mapped virtual address representing a mapping between a range of virtual addresses in the virtual memory space and the physical addresses represented by the cluster; and
 returning a reference to the mapped virtual address to the client.

15. The method of claim 14, further comprising:
 determining whether enough clusters have been formed to satisfy the request; and
 if the enough clusters have not been formed to satisfy the request, iteratively decrementing the target range size and forming as many clusters from the groups of contiguous addresses as possible from the groups of contiguous addresses until the enough clusters have been formed to satisfy the request or the entire pool of physical addresses has been allocated.

16. The method of claim 14 wherein the maximum threshold size is the smaller of a largest supported cluster size or a total size of the pool of physical addresses.

* * * * *